(12) United States Patent
Yoshida et al.

(10) Patent No.: US 9,090,160 B2
(45) Date of Patent: Jul. 28, 2015

(54) VEHICLE BODY STRUCTURE

(71) Applicant: HONDA MOTOR CO., LTD., Minato-ku, Tokyo (JP)

(72) Inventors: Masayasu Yoshida, Wako (JP); Mitsushige Goto, Wako (JP); Takeki Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/365,190

(22) PCT Filed: Nov. 14, 2012

(86) PCT No.: PCT/JP2012/079472
§ 371 (c)(1),
(2) Date: Jun. 13, 2014

(87) PCT Pub. No.: WO2013/088896
PCT Pub. Date: Jun. 20, 2013

(65) Prior Publication Data
US 2014/0333056 A1    Nov. 13, 2014

(30) Foreign Application Priority Data

Dec. 15, 2011    (JP) .................................. 2011-274423

(51) Int. Cl.
*B60K 15/063*    (2006.01)
*B62D 21/15*    (2006.01)
(Continued)

(52) U.S. Cl.
CPC ............. *B60K 15/063* (2013.01); *B60K 15/067* (2013.01); *B62D 21/155* (2013.01);
(Continued)

(58) Field of Classification Search
CPC .... B60K 15/063; B60K 15/067; B62D 27/06; B62D 21/155; B62D 25/2045
See application file for complete search history.

(56) References Cited

U.S. PATENT DOCUMENTS

| 6,811,211 B2 | 11/2004 | Saito |
| 7,758,075 B2 | 7/2010 | Isayama et al. |
| 2012/0212009 A1 | 8/2012 | Ishizono et al. |

FOREIGN PATENT DOCUMENTS

| JP | H05201356 A | 8/1993 |
| JP | 2000-085382 A | 3/2000 |
| JP | 2001-219873 A | 8/2001 |
| JP | 2004237920 A | 8/2004 |
| JP | 3765947 B2 | 4/2006 |
| JP | 2007283972 A | 11/2007 |

(Continued)

OTHER PUBLICATIONS

Office Action with a mailing date of Apr. 21, 2015 issued in the corresponding Japanese Application P2013-549173 with a partial English translation thereof.

*Primary Examiner* — Joseph Rocca
*Assistant Examiner* — Gabriela C Craciun
(74) *Attorney, Agent, or Firm* — Carrier Blackman & Associates, P.C.; Joseph P. Carrier; William D. Blackman

(57) ABSTRACT

A floor panel of a vehicle body is provided with bulging sections in which seats are disposed to the left and right of a tunnel section, and a rear tunnel cross member extending in the vehicle width direction at the rear ends of the bulging sections. The vehicle body is provided with left and right floor extensions set further toward the tunnel section along a dashboard lower relative to the front side frames, floor frames extending so as to span between the floor extensions and the rear tunnel cross member and having a predetermined distance in the vehicle body vertical direction from a rear floor panel, and an energy container placed below the bulging sections and supported on the floor frames. The floor frames are fixed to the vehicle body so as to be capable of being removed from the below the vehicle body.

5 Claims, 35 Drawing Sheets

(51) Int. Cl.
  *B62D 25/20* (2006.01)
  *B60K 15/067* (2006.01)
  *B62D 27/06* (2006.01)

(52) U.S. Cl.
  CPC ............ *B62D25/2045* (2013.01); *B62D 27/06* (2013.01); *B60K 2015/0632* (2013.01); *B60K 2015/0634* (2013.01); *B60Y 2306/01* (2013.01)

(56) References Cited

FOREIGN PATENT DOCUMENTS

| | | |
|---|---|---|
| JP | 2008-230460 A | 10/2008 |
| JP | 2009018724 A | 1/2009 |
| JP | 2011-121483 A | 6/2011 |
| JP | 2011-126422 A | 6/2011 |
| WO | 2011/055695 A1 | 5/2011 |

VEHICLE BODY STRUCTURE

TECHNICAL FIELD

The present invention relates to a vehicle body structure in which left and right front side frames are extended in a front-rear direction, a dashboard lower that divides the vehicle body into front and rear portions is disposed, a floor panel is extended from the dashboard lower in a rear direction of the vehicle body and a tunnel section bulges in an upper direction of the vehicle body from the dashboard lower and a center of a vehicle width of the floor panel.

BACKGROUND ART

There is a known vehicle body structure having this type of structure, in which left and right front side frames are extended in a front-rear direction, a dashboard lower that divides the vehicle body into the front and rear portions is disposed, a floor panel is extended from the dashboard lower in a rear direction of the vehicle body, a tunnel section bulges in an upper direction of the vehicle body from the dashboard lower and a center of a vehicle width direction of the floor panel, and a fuel tank as an energy container is disposed in a lower direction of the floor panel and the tunnel section (see Patent Literature 1, for example).

According to the vehicle body structure disclosed in this Patent Literature 1, the fuel tank can be enlarged in the vehicle width direction.

Further, there is another known vehicle body structure in which a front side frame is extended in a front-rear direction, a side frame extension and a floor extension are branched from the front side frame, the side frame extension is connected to a side sill, and the floor extension is connected to a floor frame (see Patent Literature 2, for example).

According to the vehicle body structure disclosed in Patent Literature 2, a load acting on the front side frame can be dispersed.

There is another known vehicle body structure including a cabin (vehicle interior) between a front axle and a rear axle, and a floor tunnel between a driver's seat and a front passenger seat, where a fuel tank is disposed below a driver's seat and a front passenger seat and below a floor, the fuel tank is configured so as to overlap with a seat surface of the driver's seat and a seat surface of the front passenger seat when the vehicle is seen from above, the fuel tank is partially inserted into the floor tunnel to be fixed to a sub-frame, and the sub-frame is mounted on a vehicle body lower side of the vehicle body (see Patent Literature 3, for example).

According to the vehicle body structure disclosed in this Patent Literature 3, a space below the driver's seat and the front passenger seat can be effectively used.

Further, there is still another known vehicle body structure in which left and right main frames are disposed in a front-rear direction of the vehicle body, a floor panel formed with a floor bending surface and a floor horizontal surface is provided, a floor upper member fixed to an upper surface of the main frame and an upper surface of the floor horizontal surface is provided, a floor lower member fixed to a lower surface of the main frame and a lower surface of the floor horizontal surface is provided, and a battery case as an energy container is disposed below the floor lower member (see Patent Literature 4, for example).

According to the vehicle body structure disclosed in this Patent Literature 4, it is possible to avoid downward projection of the floor lower member disposed on the lower surface of the floor horizontal surface by providing the floor upper member on the upper surface of the floor horizontal surface.

According to the vehicle body structure in Patent Literature 1, high capacity of the fuel tank is achieved by enlarging the fuel tank in the vehicle width direction, but the capacity of the fuel tank is desired to be more increased in a vehicle body height direction.

According to the vehicle body structure in Patent Literature 2, the load acting on the front side frame is demanded to be dispersed more efficiently.

According to the vehicle body structure in Patent Literature 3, the fuel tank is fixed to the sub-frame and the sub-frame is mounted on the vehicle body lower side of the vehicle body. At this point, attaching/detaching work for the fuel tank is demanded to be performed more efficiently.

According to the vehicle body structure of Patent Literature 4, it is possible to avoid the downward projection of the floor lower member provided on the lower surface of the floor horizontal surface by providing the floor upper member on the upper surface of the floor horizontal surface, but is demanded to use the space below the floor more effectively.

PRIOR ART LITERATURES

Patent Literatures

Patent Literature 1: WO 2011/055695 A
Patent Literature 2: JP 2011-126422 A
Patent Literature 3: JP 3765947 B1
Patent Literature 4: JP 2011-121483 A

SUMMARY OF INVENTION

Technical Problem

An object of the present invention is to provide a vehicle body structure capable of balancing high capacity of an energy container (fuel tank) and a lowered floor of the vehicle body (lowering a vehicle height) in a high level, and further promoting weight reduction of the vehicle body.

Further, there is another object of the present invention to provide the vehicle body structure capable of dispersing a load efficiently, transmitting the load to a rear side of the vehicle body; and protecting feet of an occupant.

Moreover, there is still another object of the present invention is to provide the vehicle body structure capable of improving property of attaching/detaching the fuel tank and improving work efficiency of attaching the fuel tank, considering simplicity in attaching or detaching the fuel tank to or from the vehicle body side.

Furthermore, there is still another object of the present invention is to provide the vehicle body structure capable of appropriately absorbing an impact load while achieving the above-mentioned higher capacity of the energy container, lowered floor of the vehicle body, and weight reduction of the vehicle body.

Solution to Problem

According to a first aspect of the invention, there is provided a vehicle body structure, comprising: left and right front side frames positioned at a front portion of a vehicle body and extending in a front-rear direction of the vehicle body; a dashboard lower positioned at a rear side of the left and right front side frames and dividing the vehicle body into front and rear portions; a floor panel extending in a vehicle width direction of the vehicle body and also extending rearward from a lower portion of the dashboard lower; and a tunnel section extending from a center of the vehicle width and a lower end of the dashboard lower to a rear portion of the floor panel, and bulging upward from the floor panel, wherein the floor panel includes: left and right bulging sections disposed on left and right sides of the tunnel section for installation of seats of the vehicle body; and a rear tunnel cross member disposed on rear ends of the left and right bulging sections and extending in the vehicle width direction, the vehicle body includes: left and right floor extensions deflected toward the tunnel section along a lower surface of the dashboard lower from rear ends of the left and right front side frames; left and right floor frames extending so as to span between the left and right floor extensions and the rear tunnel cross member, and having a predetermined distance in a vehicle body vertical direction from a rear floor panel; and an energy container disposed below the bulging sections and supported by the floor frames, and the floor frames are detachably fixed to the vehicle body from the lower side of the vehicle body.

Preferably, in the invention according to a second aspect, the vehicle body includes a front tunnel cross member spanning between the left and right floor extensions and extending in the vehicle width direction along a lower surface of the tunnel section near a joint, of the dashboard lower and the floor panel, the floor panel includes a front floor panel and a rear floor panel on front and rear sides of the vehicle body in a dividing manner, the front floor panel includes footrest sections bulging in a lower direction of the vehicle body and disposed on left and right sides of the tunnel section at positions corresponding to feet of occupants riding on the vehicle body, and the rear floor panel includes the bulging sections, and the front floor panel has a strength higher than a strength of the rear floor panel.

Preferably, in the invention according to a third aspect, each of the left and right floor extensions includes a load transmitting section formed with a recessed cross-section by closing rear ends of left and right vertical wall sections inward, and each of the floor frames includes a main body section having a hat-like cross-section and a lid section closing the main body section, the floor frames having a load receiving section formed by bending a flange downward from a front end of the main body section, and the load transmitting section and the load receiving section are positioned so as to face each other when the floor frames are mounted on the vehicle body.

Preferably, in the invention according to a fourth aspect, the vehicle body comprising: left and right side sills positioned on the rear side of the dashboard lower and further positioned on a more outer side of the vehicle width than the left and right front side frames, extending in a front-rear direction of the vehicle body; left and right side sill extensions deflected toward the side sills along a lower surface of the front floor panel from rear ends of the left, and right front side frames; and a center tunnel cross member spanning between the left and right side sills above a joint of the front floor panel and the rear floor panel, wherein the front floor panel includes the footrest sections each disposed between one of the floor extensions and an adjacent one of the side sill extensions.

Preferably, in the invention according to a fifth aspect, each of the footrest sections includes a reinforcing section further bulging in a lower direction of the vehicle body and substantially triangle-shaped between one of the floor extensions and an adjacent one of the side sill extensions.

Advantageous Effects of Invention

According to the first aspect of the invention, the energy container supported by the floor frames can be detachably fixed from the lower side of the vehicle body in the vehicle body structure, thereby greatly improving work efficiency compared to the related art in which fixing is fixed by a tank band. Particularly, the energy container can be automatically attached by a facility machine.

Further, since the floor frames extend so as to span between the left and right floor extensions and the rear tunnel cross member, the floor panel is prevented from deforming and the occupant can be protected, and simultaneously the energy container can be protected from the impact load. Moreover, since the impact load applied from the left and right front side frames can be transmitted to the floor frames via the left and right floor extensions, the floor panel is prevented from deforming and the occupant can be protected.

According to the second aspect of the invention, the front floor panel is configured to have high strength, and the front tunnel cross member is provided between the left, and right floor extensions near the joint of the dashboard lower and the floor panel, and therefore a larger load can be received and burden to the floor frames can be reduced when the load applied from the front side frame is transmitted to the left and right floor extensions and the tunnel section of the floor panel.

Also, since the front floor panel is configured to have the high strength, the load can be transmitted to the rear side of the vehicle body through surface dispersion without concentrating the load and causing deform and the feet of the occupant can be protected when the load is applied. Since the front floor panel is configured to have the high strength and further the front tunnel cross member can receive the large load by the tunnel section, it is possible to eliminate a framework member extending in the front-rear direction of the vehicle body, generally required to secure rigidity, thereby contributing the weight reduction.

Furthermore, since the front floor panel is configured to have the high strength and the front tunnel cross member is provided between the left and right floor extensions near the joint of the dashboard lower and the floor panel, the larger load can be received and the burden on the floor frames is reduced when the load applied to the front side frames is transmitted to the left and right floor extensions and the tunnel section of the floor panel. Therefore, the floor frames may have thickness enough to receive the load transmitted to the front floor panel and having the reduced burden, thereby contributing to lowering the floor of the vehicle body (lowering vehicle height).

Additionally, since the front floor panel is configured to have the high strength and the front tunnel cross member is provided between the left and right, floor extensions near the joint of the dashboard lower and the floor panel, the larger load can be received and the burden on the floor frames is reduced when the load applied to the front side frames is transmitted to the left and right floor extensions and the tunnel section of the floor panel. Therefore, the floor frames may have the thickness enough to receive the load transmitted to the front floor panel and having the reduced burden, influence of the floor frames to the energy container (height of the recessed section on the lower surface of the energy container) is reduced, and the published supply oil amount (fuel amount) can be increased because there is no possibility that the fuel pump provided at the center of the vehicle width cannot suction the fuel existing more outer side than the recessed section to result in reducing substantial capacity of the energy container.

According to the third aspect of the invention, the load transmitting section and the load receiving section are positioned to face each other when the floor frames are fixed to the vehicle body, and therefore, the burden is reduced by the front tunnel cross member and the tunnel section when the impact load is applied from the front side to the vehicle body. As a result, appropriate load transmission can be achieved as the hollow hat-like cross-section.

Furthermore, since the appropriate load transmission can be achieved even when the floor frames supporting the energy container are curved lower than the fixing position of the floor extensions of the floor frames, the floor of the vehicle body can be lowered (lowering the vehicle height) or the capacity of the energy container can be increased.

According to the fourth aspect of the invention, the large load can be received by connecting the load applied from the left and right front side frames to the left and right side sills via the side sill extensions, thereby reducing the burden on the floor panel and the floor frames.

Further, the high-strength footrest section (front floor panel) is disposed between the floor extensions and the side sill extensions, and the center tunnel cross member is disposed above the joint of the front floor panel and the rear floor panel. Therefore, the load transmitted to the front floor panel having the reduced burden by being connected to the left and right side sills is transmitted to the left and right side sills via the tunnel cross member. As a result, furthermore, the floor frames may have the thickness enough to receive the load having the reduced burden, thereby contributing to lowering the floor of the vehicle body (lowering the vehicle height).

Moreover, since the high-strength footrest sections (front floor panel) are disposed between the floor extensions and the side sill extensions and the substantially triangle-shaped body with high rigidity is formed, the load can be transmitted to the rear side of the vehicle body without deforming the front floor panel when the load is applied, and the feet of the occupant can be protected.

According to the fifth aspect of the invention, the reinforcing section is provided at the footrest section (front floor panel) between each of the floor extensions and an adjacent one of the side sill extensions, the load transmitted to the front floor panel having the reduced burden by being connected to the left and right side sills is transmitted to the left and right side sills via the center tunnel cross member. As a result, the floor frames may have the thickness enough to receive the load having the reduced burden, thereby contributing to lowering the floor of the vehicle body (lowering the vehicle height).

Further, since the reinforcing section is provided at the footrest section (front floor panel) between each of the floor extensions and an adjacent one of the side sill extensions, the footrest sections is formed to be the substantially triangle-shaped body with high rigidity. As a result, the load can be transmitted to the rear side of the vehicle body without deforming the front floor panel when the load is applied, and the feet of the occupant can be protected.

DESCRIPTION OF EMBODIMENTS

A preferred embodiment of the present invention will be described in detail below based on the attached drawings.

EMBODIMENT

Figure 1:
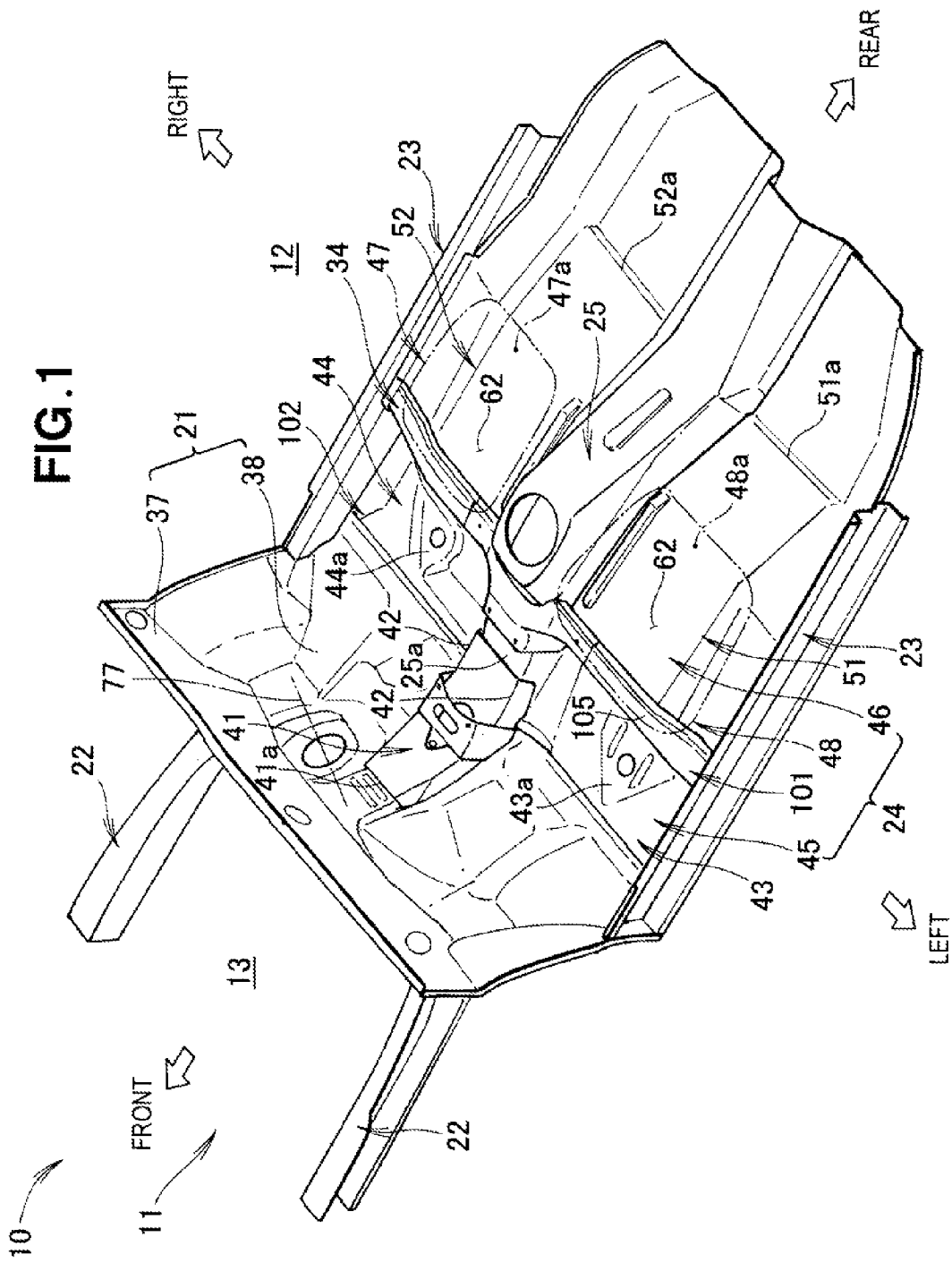
FIG. 1 is a perspective view showing a front portion of a vehicle body according to the present invention.
Figure 2:
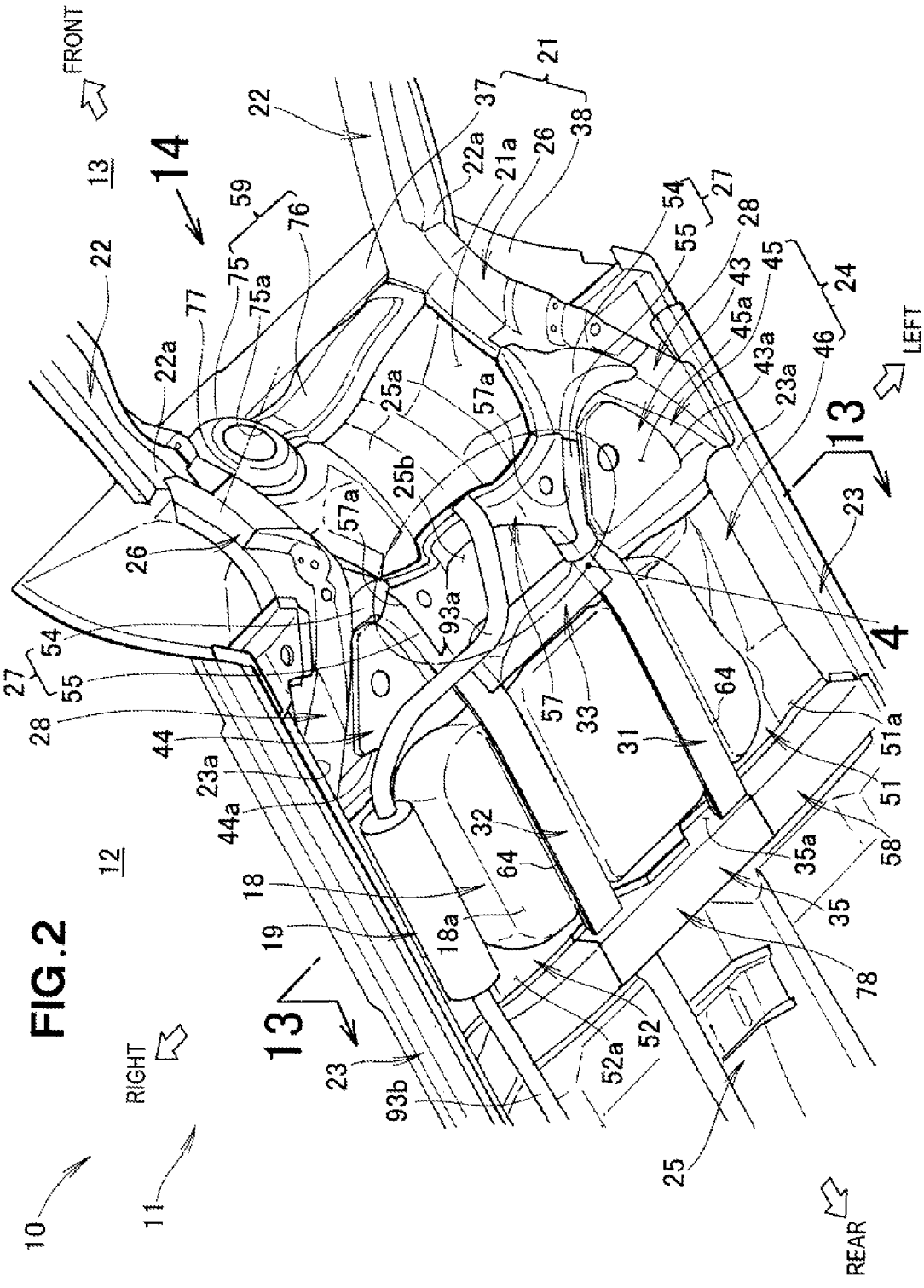
FIG. 2 is a perspective view of the front portion of the vehicle body shown in FIG. 1 when viewed from below.
Figure 3:
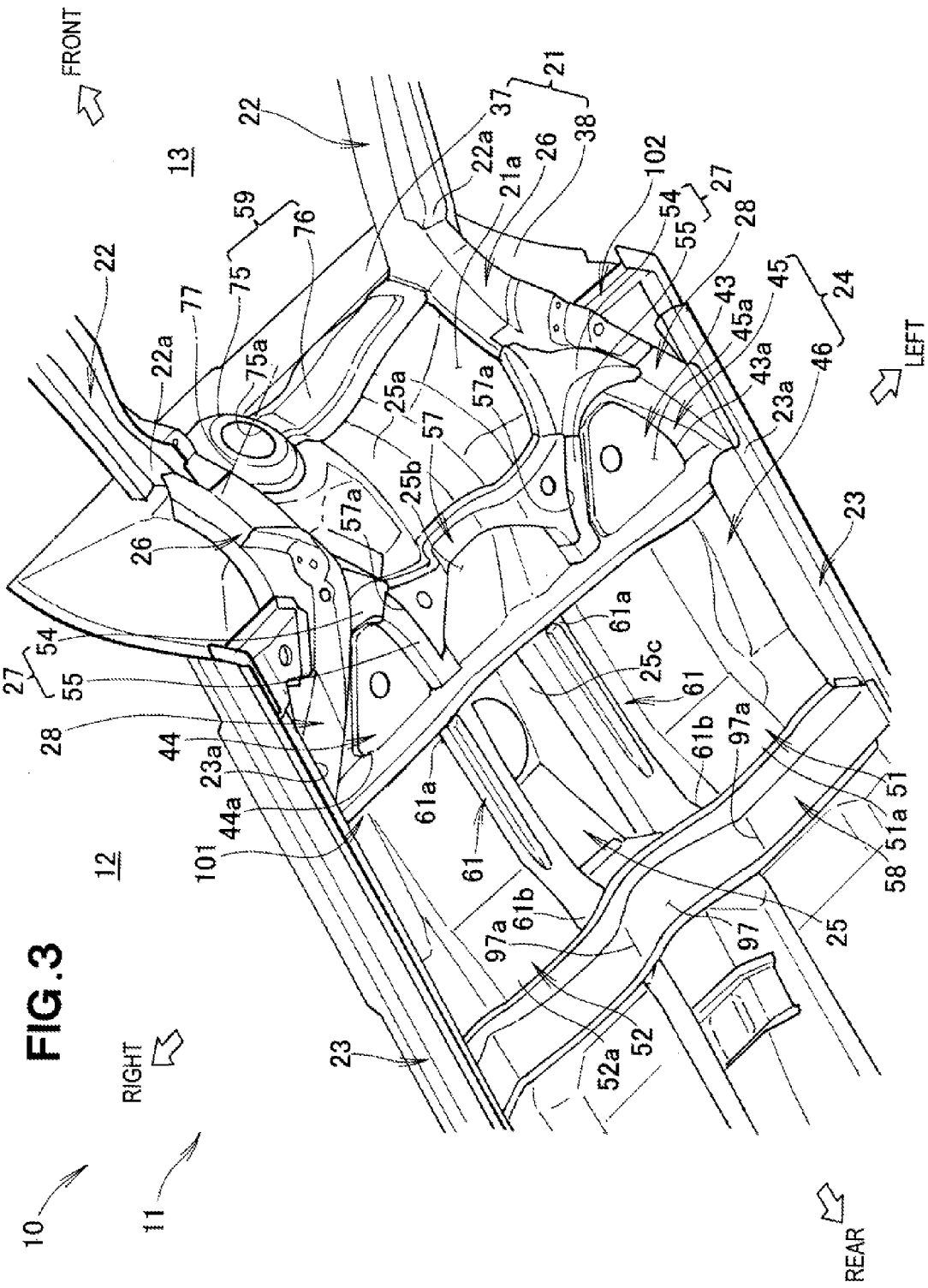
FIG. 3 is a perspective view of the front portion of the vehicle body shown in FIG. 2 with a fuel tank and a muffler removed.
Figure 4:
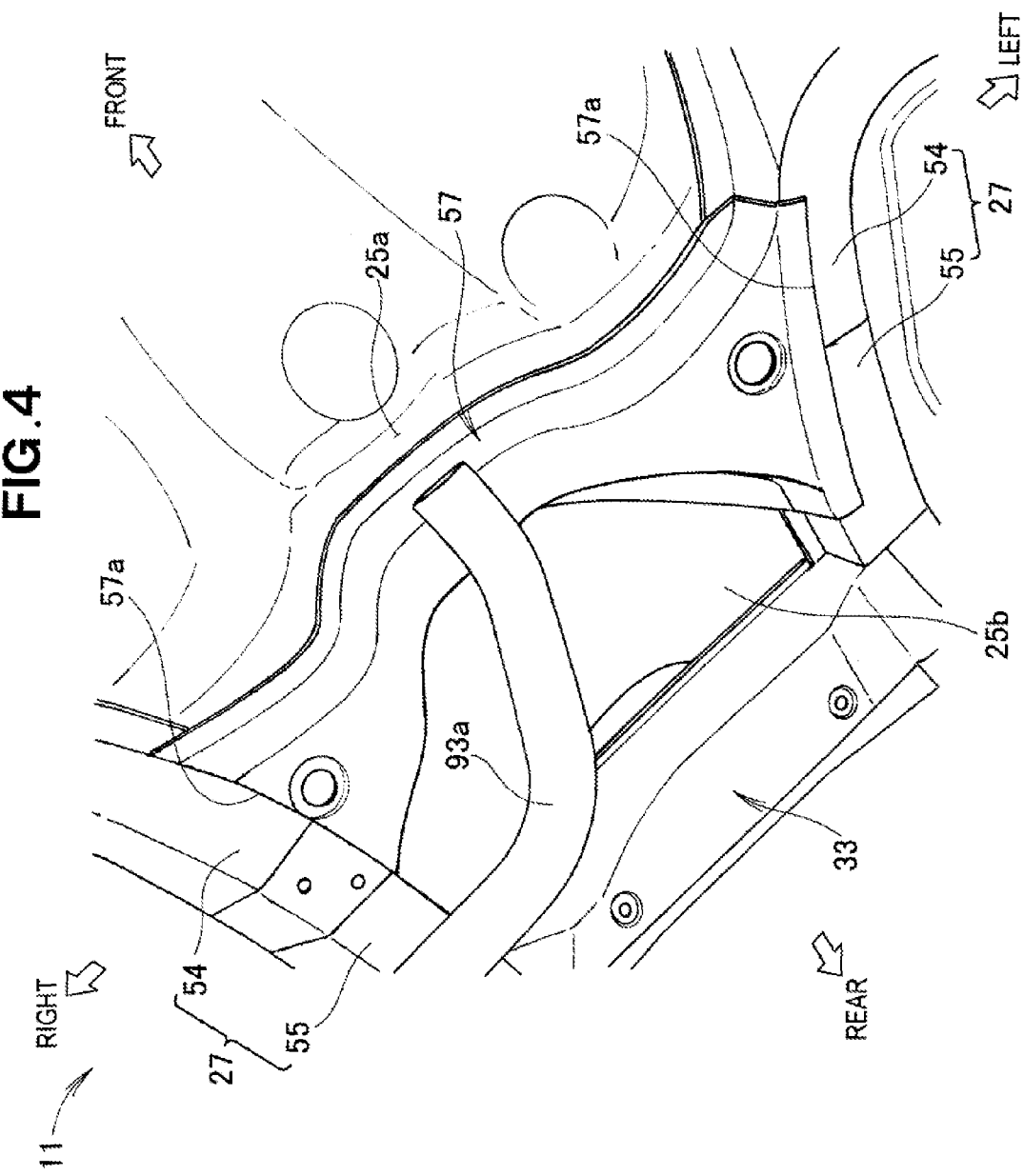
FIG. 4 is an enlarged view of an area 4 in FIG. 2.

A vehicle 10 according to the present embodiment illustrated in the drawings is a passenger car. As illustrated in FIGS. 1 to 3, an engine room 13 of a front portion and a vehicle interior 12 positioned right behind the engine room 13 are formed on an inner side of a vehicle body 11. The vehicle 10 includes a fuel tank 18 mounted on a front half portion of the vehicle body 11, and a muffler 19 disposed lateral to the fuel tank 18. The fuel tank 18 is an example of an energy container storing energy, and hereinafter referred to as "energy container 18".

The vehicle body 11 is formed of a monocoque body and substantially bilaterally symmetric with respect to a vehicle body center that extends in a front-rear direction of the vehicle body through a center of a vehicle width direction of the vehicle 10.

The front half portion of the vehicle body 11 includes a dashboard lower 21, left and right front side frames 22, 22, left and right side sills 23, 23, a floor panel 24, a tunnel section 25, left and right side frame extensions 26, 26, left and right floor extension 27, 27, left and right side sill extensions 28, 28, left and right floor frames 31, 32, a front floor cross member 33, a center tunnel cross member 34, a rear floor cross member 35, a front tunnel cross member 57, and a rear tunnel cross member 58. In other words, the vehicle body structure is a structure of the front half portion of the vehicle body 11.

In the vehicle body structure according to the present embodiment, the floor panel 24 is formed of two divided portions: a front floor panel 45 and a rear floor panel 46. The front floor panel 45 has higher strength than the rear floor panel 46, and therefore, a burden on tunnel frames 61, 61 can be reduced and a vertical width can be set thin. Consequently, capacity expansion can be achieved giving small influence to the capacity of the fuel tank 18.

The floor extensions 27, 27 extend from rear ends 22a, 22a of the left and right front side frames 22, 22 along a lower surface 21a of the dashboard lower 21. The floor frames 31, 32 are bridged to the rear tunnel cross member 58 on the rear side of bulging sections 51, 52 where seats 47, 48 of the vehicle body 11 are disposed on the floor panel 24. These floor extensions 27, 27 and floor frames 31, 32 support the fuel tank (energy container) 18 and fix the fuel tank 18 detachably from the lower side of the vehicle body.

The dashboard lower 21 is positioned on the rear side of the left and right front side frames 22, 22 and divides the vehicle body 11 into front and rear portions. In other words, the dashboard lower is a separation wall that separates the engine room 13 on the front side from the vehicle interior 12 on the rear side, and in a side view, is formed substantially in an L-shape.

More specifically, the dashboard lower 21 is an integration of a vertical surface 37 separating the engine room 13 from the vehicle interior 12 and a dashboard lower inclined surface 38 extending from a lower end of the vertical surface 37 in a downward rear direction.

Figure 14:
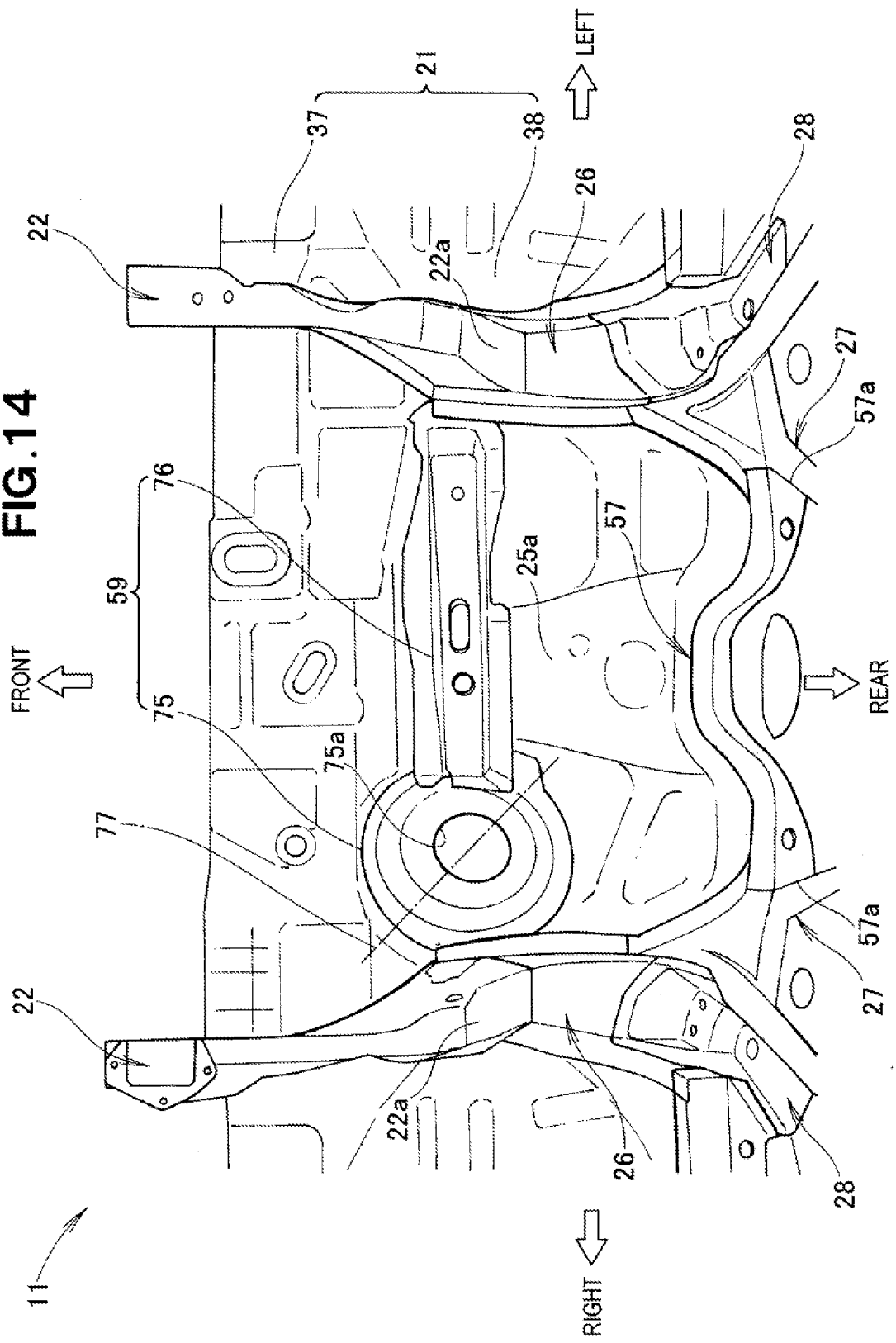
FIG. 14 is an enlarged view when viewed from the direction of arrow 14 shown in FIG. 2.

The dashboard lower 21 includes a tunnel stiffener 41 mounted so as to cover a front portion 25a of the tunnel section 25, and a dashboard cross member 59 bridged between the left and right front side frames 22, 22 at a position corresponding to a front end 41a of the tunnel stiffener 41 (see FIG. 14).

The left and right front side frames 22, 22 is positioned in a front portion of the vehicle body 11 and extends in the front-rear direction of the vehicle body 11.

The floor panel 24 extends in the vehicle width direction of the vehicle body 11 and stretching rearward from a lower portion of the dashboard lower 21. The floor panel 24 is divided into the front floor panel 45 including footrest sections 43, 44 on the front side and the rear floor panel 46 on the rear side in the vehicle body 11. The footrest sections 43, 44 are disposed on left and right sides of the tunnel section 25 in a bulging manner to the lower side of the vehicle body 11 at positions corresponding to feet of occupants riding on the vehicle body 11. The rear floor panel 46 is disposed on the rear side of the front floor panel 45 in the vehicle body so as to extend in the vehicle width direction (see FIG. 7).

The front floor panel 45 has the strength higher than the rear floor panel 46. Further, the rear floor panel 46 is set at a position higher than the front floor panel 45 by a height of Si (see FIG. 8). This is for narrowing a distance between lower surfaces of the seats 47, 48 and the rear floor panel 46, and effectively utilizing a downward area of the rear floor panel 46. More specifically, the fuel tank 18 is disposed below the rear floor panel 46.

The floor panel 24 is a separate type floor panel formed of the front floor panel 45 and the rear floor panel 46. In other words, the floor panels 45, 46 are jointed but provided as the separate members on the front and rear sides in order to vary the thickness as described above.

Figure 9:
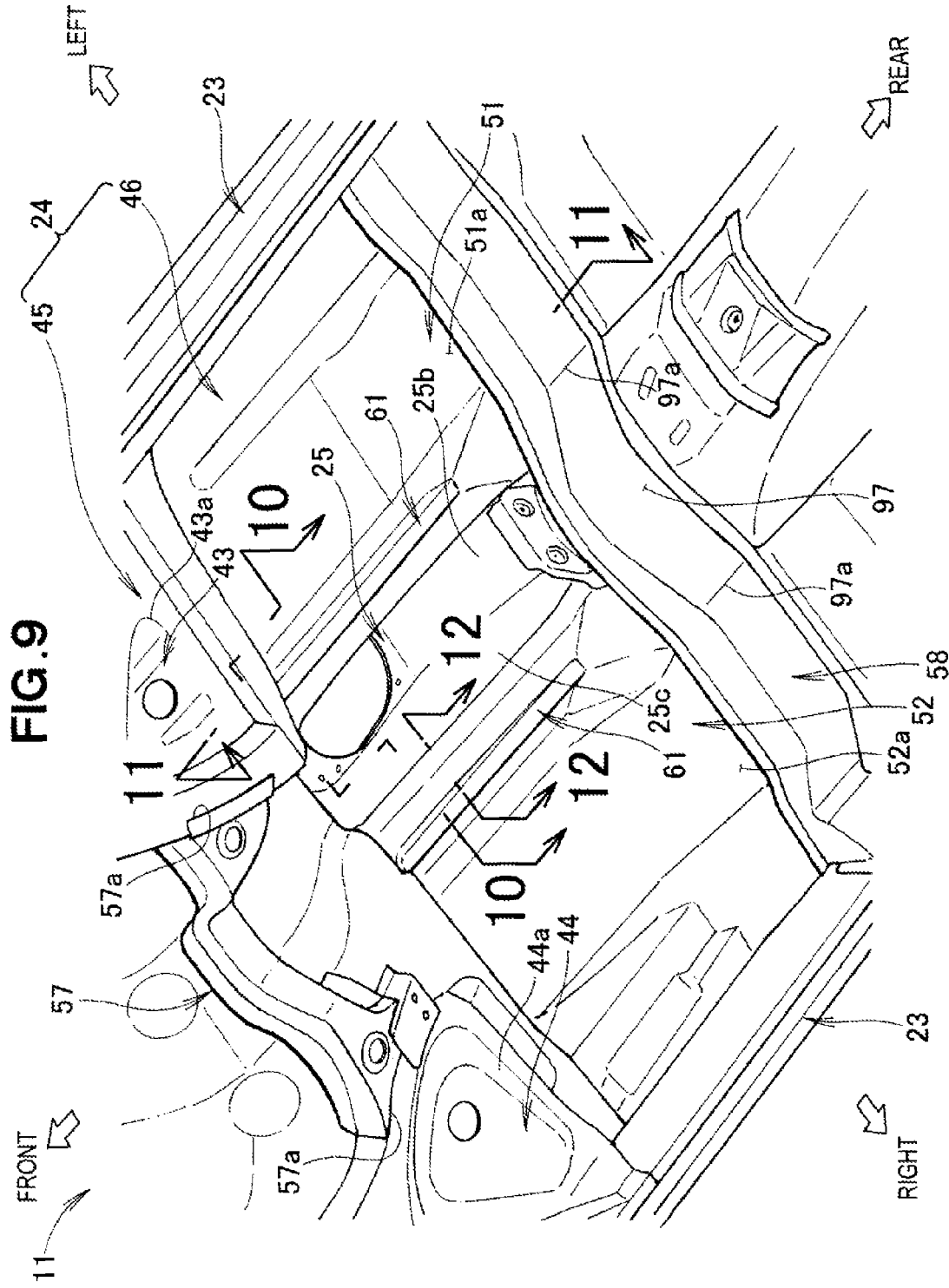
FIG. 9 is an enlarged perspective view of the front portion of the vehicle body shown in FIG. 2 with the fuel tank and the muffler removed.

The floor panel 24 includes the bulging sections 51, 52 in which the seats 47, 48 of the vehicle body 11 are disposed on the right and left sides of the tunnel section 25, and also includes the rear tunnel cross member 58 extending in the vehicle width direction at the rear ends 51a, 52a of the bulging sections 51, 52 (see FIGS. 2, 3 and 9). In other words, the rear floor panel 46 includes the bulging sections 51, 52.

The tunnel section 25 is stretched from the center of the vehicle width and the lower end of the dashboard lower 21 to the rear portion of the floor panel 24, and bulges upward from the floor panel 24 (FIG. 1).

Figure 16:
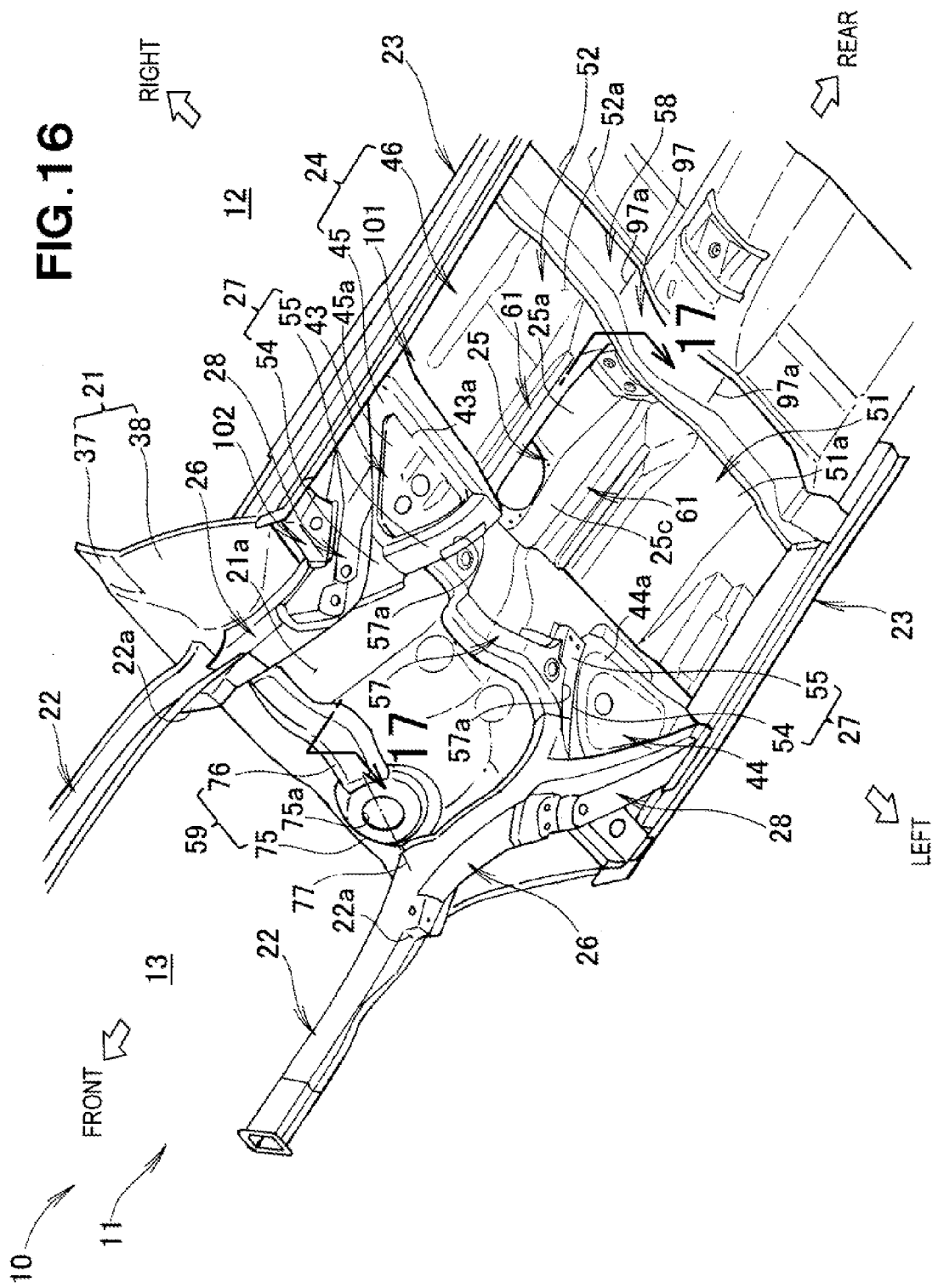
FIG. 16 is a perspective view of the front portion of the vehicle body shown in FIG. 2 when viewed from below at a different angle.

The left and right floor extensions 27, 27 are biased or deflected toward the tunnel section 25 from the rear ends 22a, 22a of the left and right front side frames 22, 22 along the lower surface 21a of the dashboard lower 21 via the side frame extensions 26, 26 (see FIGS. 2, 3 and 16).

Figure 11:
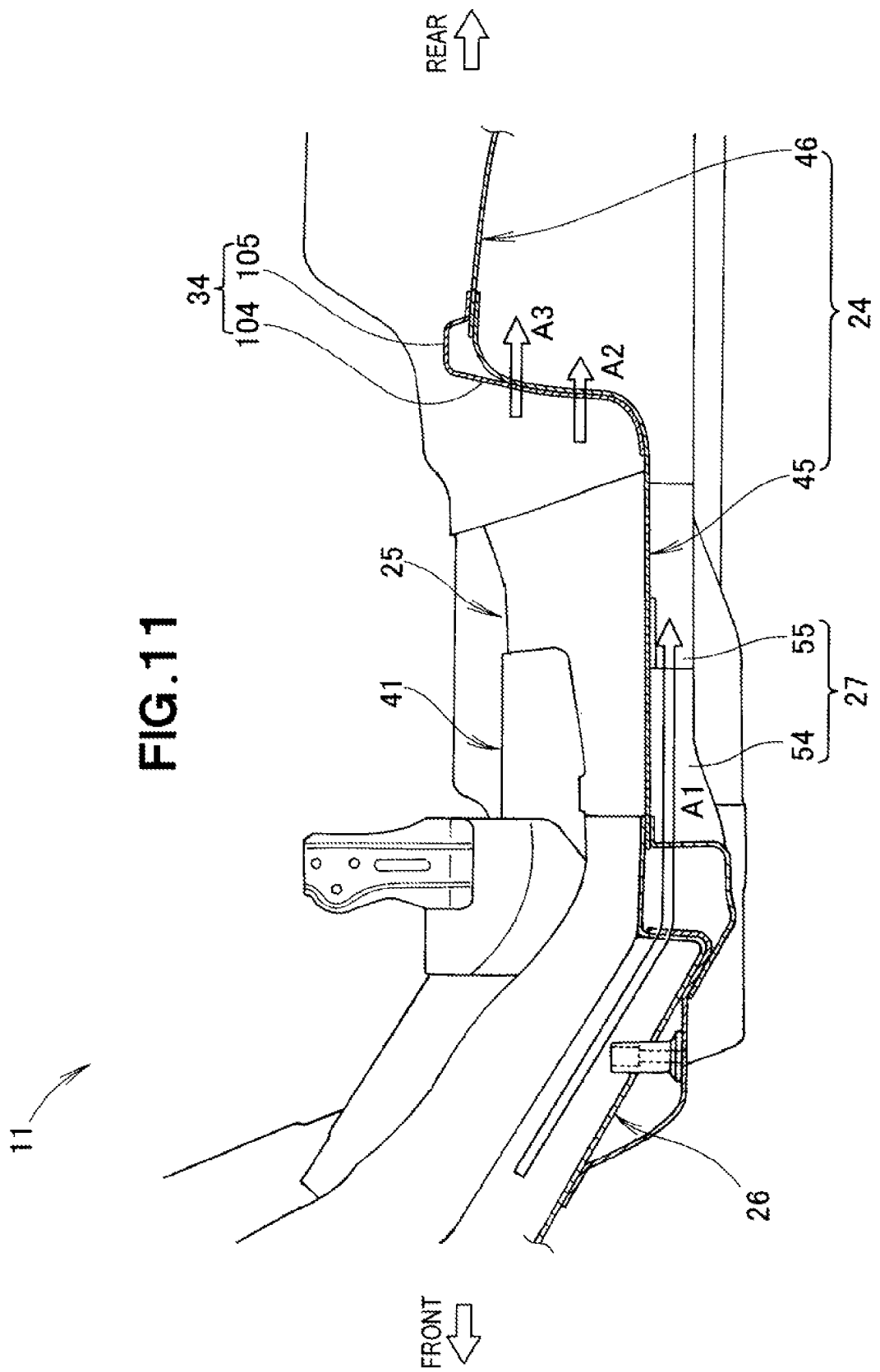
FIG. 11 is an enlarged cross-sectional view taken along line 11-11 in FIG. 9.
Figure 20:
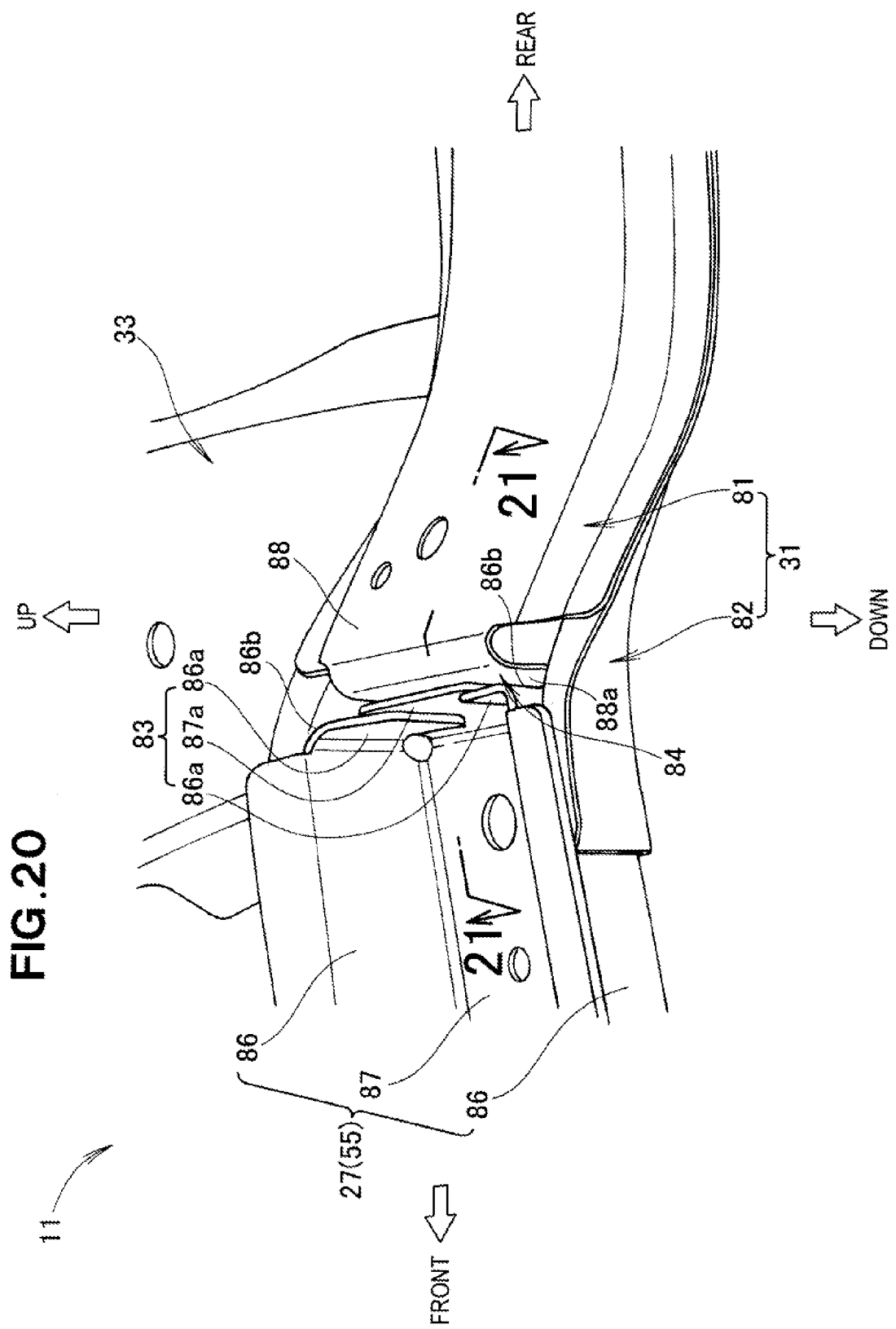
FIG. 20 is a perspective view of a periphery of a load transmitting section and a load receiving section of the front portion of the vehicle body shown in FIG. 2.
Figure 21:
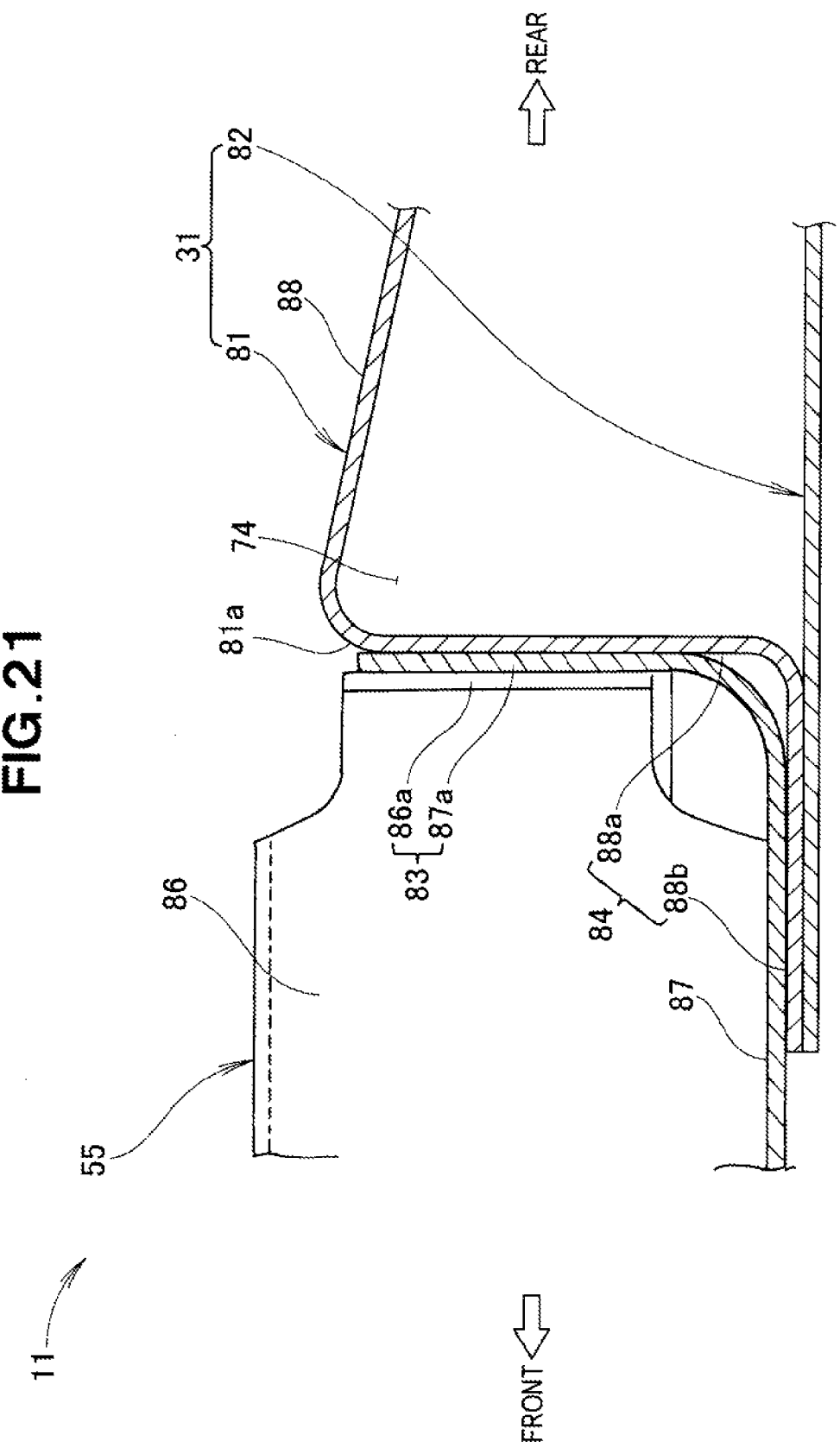
FIG. 21 is an enlarged cross-sectional view taken along line 21-21 in FIG. 20.

The floor extension 27 includes a front floor extension 54 on the front side and a rear floor extension 55 on the rear side (FIG. 3). The floor extension 27 is formed of a recessed shape in a cross-sectional view as illustrated in FIGS. 11, 20, and 21, and rear ends 86b, 86b of left and right vertical wall sections 86, 86 of the rear floor extension 55 are closed inward to form a load transmitting section 83 (more specifically, a rear flange 87a is also included in the load transmitting section 83).

As illustrated in FIGS. 1 to 5, and 9, the front tunnel cross member 57 is stretched to the left and right floor extensions 27, 27 and extends in the vehicle width direction along a lower surface 25b of the tunnel section 25 near a joint 102 of the dashboard lower 21 and the floor panel 24. More specifically, the front tunnel cross member 57 is fixed by welding near the tunnel section 25 of the joint 102 for the dashboard lower 21 and the front floor panel 45, extending in the vehicle width direction.

The front tunnel cross member 57 is disposed on the tunnel section 25 that has the high strength among the floor panel 24, and therefore, can support and reinforce the front floor panel 45 and the tunnel section 25 and also can transmit a load to the rear side of the vehicle body from the tunnel section 25.

The front tunnel cross member 57 is formed in a projecting manner along the tunnel section 25. The front tunnel cross member 57 is welded along the dashboard lower 21 and the tunnel section 25 of the front floor panel 45, and therefore, can receive the load from the dashboard cross member 59 of the front portion of the vehicle body and transmit the load to the tunnel section 25.

In the front tunnel cross member 57, both end portions 57a, 57a welded to the floor extensions 27, 27 are expanded in a fan-like shape. This structure makes it possible to transmit a large load and also secure enough strength to avoid deforming against the load from the front side.

Since the front tunnel cross member 57 is disposed more front portion of the vehicle body, compared to the structure of the related art, a larger load can be received and a burden on the floor frames 31, 32 can be reduced when the load applied to the front side frames 22, 22 are transmitted to the left and right floor frames 31, 32 (FIG. 2) and the tunnel section 25 of the floor panel 24.

Figure 18:
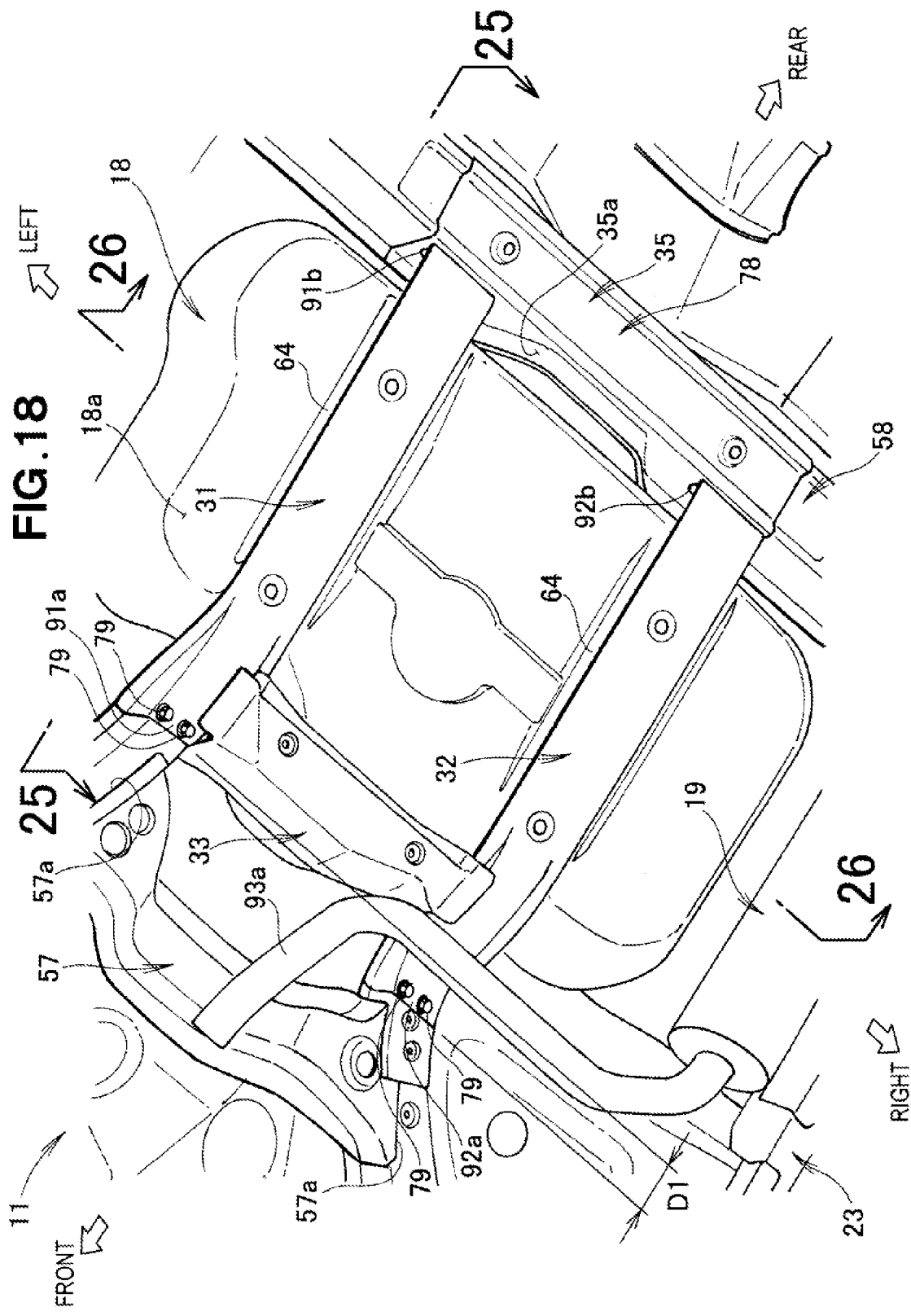
FIG. 18 is a perspective view of a periphery of the fuel tank, enlarged from the front portion of the vehicle body shown in FIG. 2.

Further, since the front tunnel cross member 57 is detachably fixed to the floor frames 31, 32 from the lower side, this structure contributes to securing a space for the front fixing sections 91a, 92a (FIG. 5) of the floor frames 31, 32 (see FIG. 18).

Meanwhile, according to the structure of the related art (see the WO 2011/055695 A), the floor panel has low strength, and therefore, it is necessary to extend the front floor extension fully up to the footrest section and provide reinforcement by disposing the front tunnel cross member 57 on the rear side.

The front floor panel 45 includes the footrest sections 43, 44 between the floor extensions 27, 27 and the side sill extensions 28, 28 (FIGS. 2 and 3).

Figure 35:
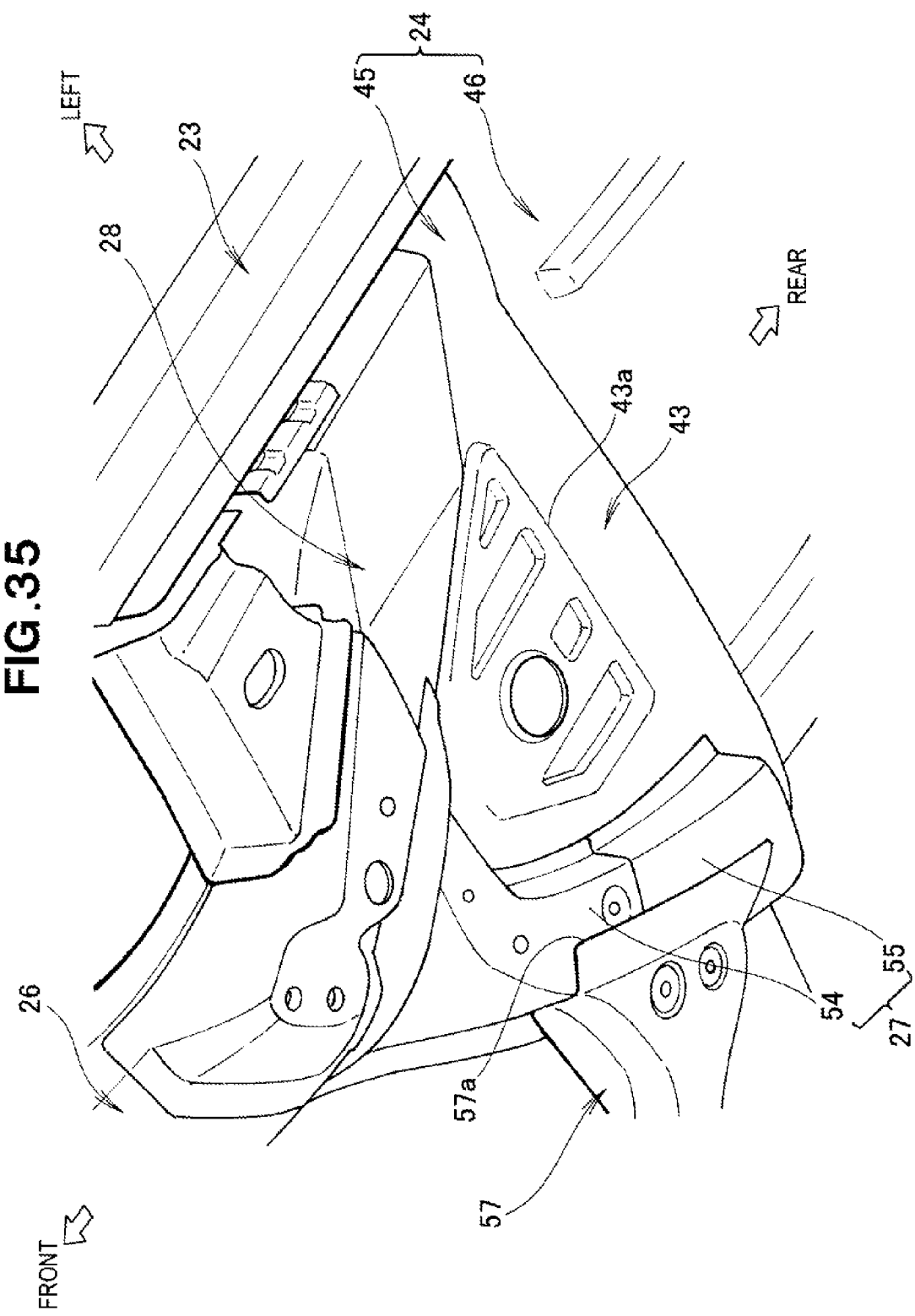
FIG. 35 is a perspective view showing a left side of the front floor panel of the front portion of the vehicle body shown in FIG. 2.
Figure 36:
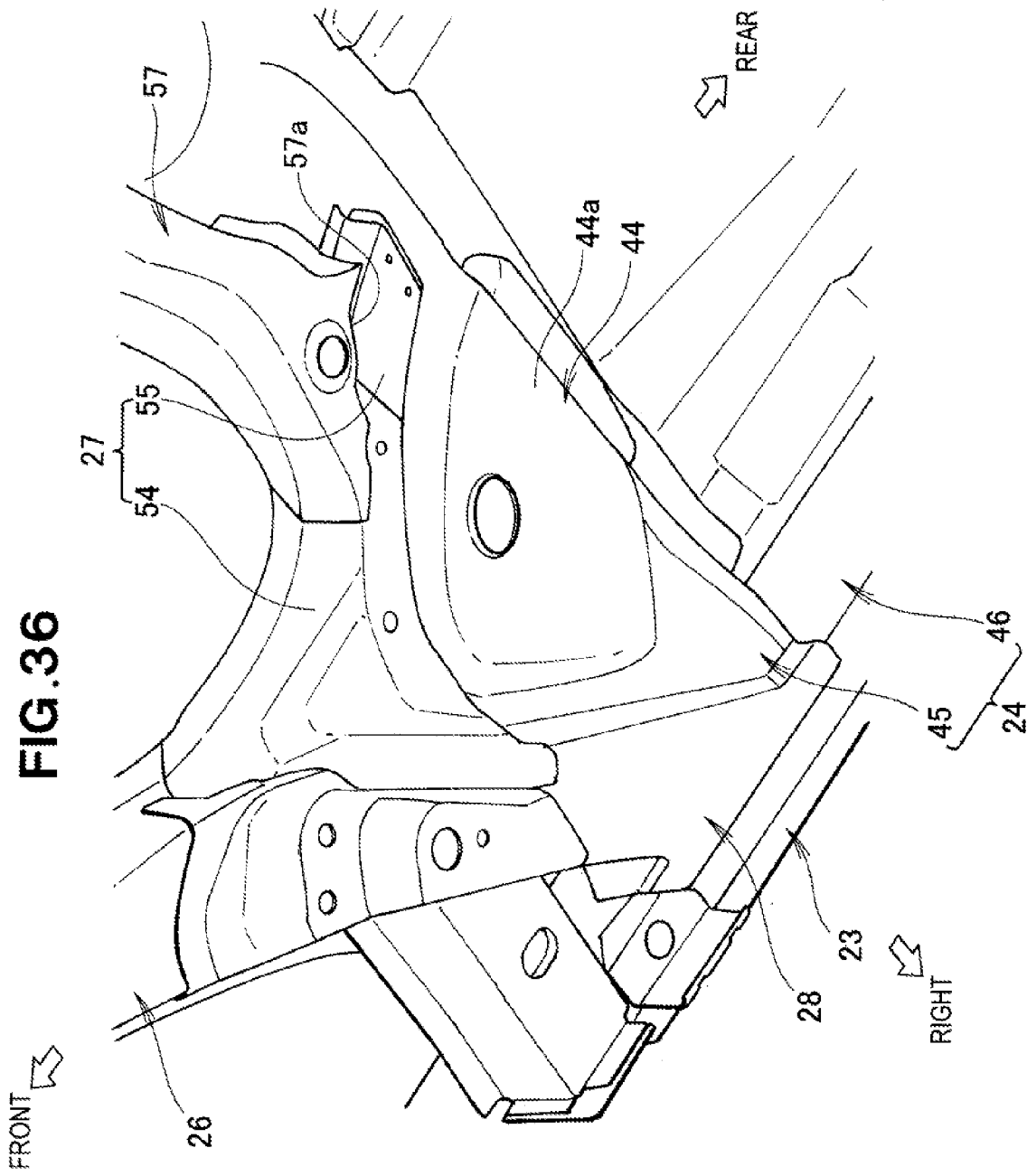
FIG. 36 is a perspective view showing a right side of the front floor panel of the front portion of the vehicle body shown in FIG. 2.

The footrest sections 43, 44 include reinforcing sections 43a, 44a substantially triangle-shaped and further bulging in the lower direction of the vehicle body 11 between the floor extensions 27, 27 and the side sill extensions 28, 28 as illustrated in FIGS. 1 to 3 (see also FIGS. 35 and 36). Since the reinforcing sections 43a, 44a of the left and right footrest section 43, 44 (between the side sill extension 28, 28 and the floor extensions 27, 27) are substantially triangular-shaped and formed bulging in the lower direction, the feet of the occupants can be more protected and the load can be transmitted to the rear side of the vehicle body through surface dispersion without concentrating the load and causing deform.

Figure 6:
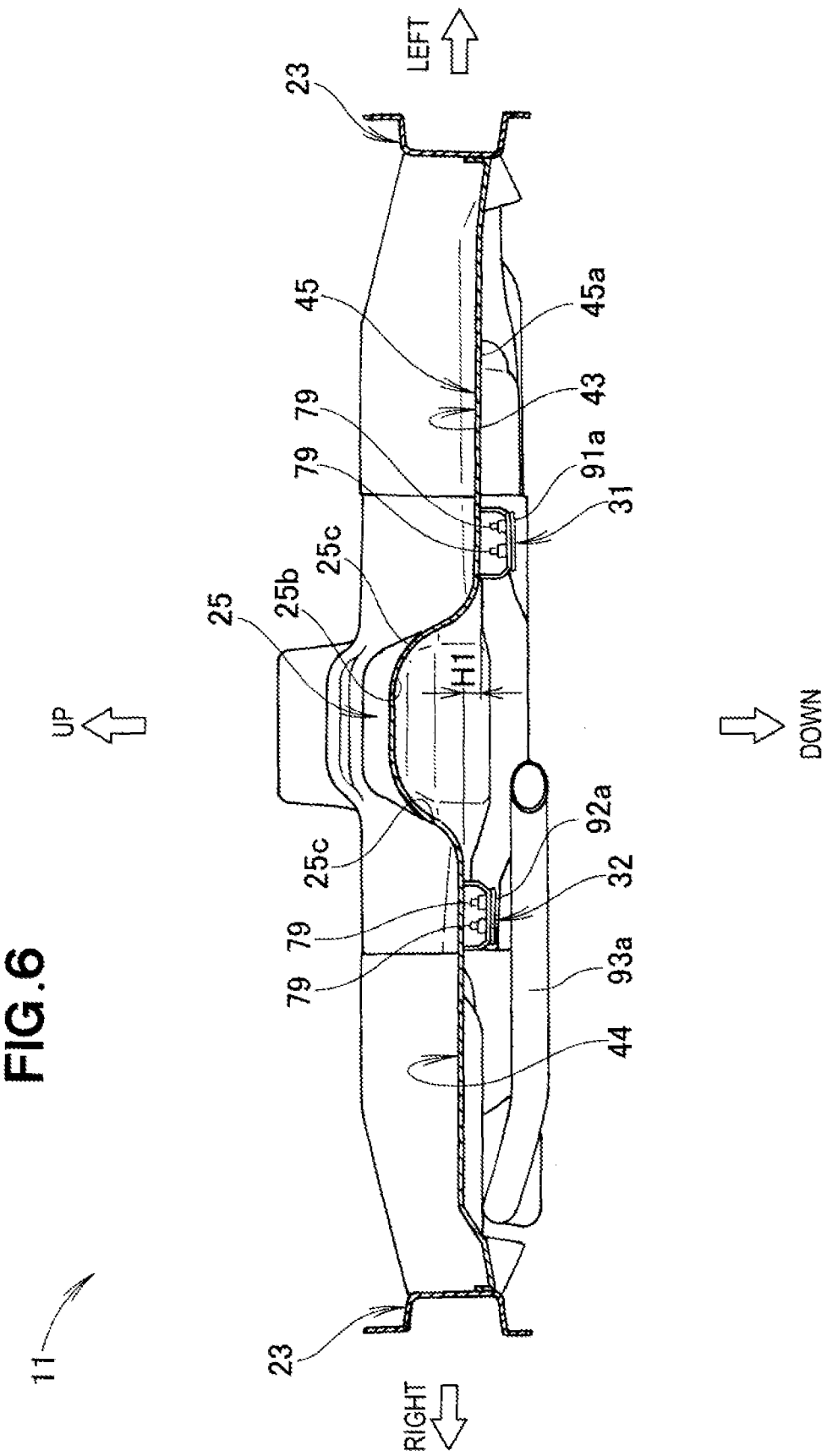
FIG. 6 is a cross-sectional view taken along line 6-6 in FIG. 5.

Further, one of the footrest sections 43, 44 is formed bulging in an upper direction to form a step H1 between the left and right sides at the left, and right footrest sections 43, 44 (FIG. 6). Consequently the front fixing sections 91a, 92a of the floor frames 31, 32 are deviated in the vertical direction, thereby achieving to pass piping 93a, 93b of the muffler 19 (FIG. 2). Note that the step H1 is set to an extent that no vertical difference is generated in a shaft center (no moment is generated) so as to smoothly transmit the load to the floor frames 31, 32. Since the height of the front floor panel 45 in the vertical direction of the vehicle body is changed, the piping 93a, 93b of the muffler 19 can be implemented without thinning the rear floor extension 55 and the floor frames 31, 32.

The front floor panel 45 is provided with the footrest sections 43, 44 of the occupants on the left, and right sides. The front floor panel 45 is formed using a high-strength steel sheet having the thickness 1.2 t. The thickness is doubled of a normal thickness 0.6 t. Therefore, when a load is applied, the load can be transmitted to the rear side of the vehicle body through surface dispersion without concentrating the load and causing deform, and the feet of the occupants can be protected.

Also, the fuel tank 18 disposed behind thereof can be protected. The surface dispersion acting on the load contributes to reducing the weight of the vehicle body 11 and expansion (capacity expansion/thickness reduction) of the fuel tank 18 in an outer direction of the vehicle width.

Figure 25:
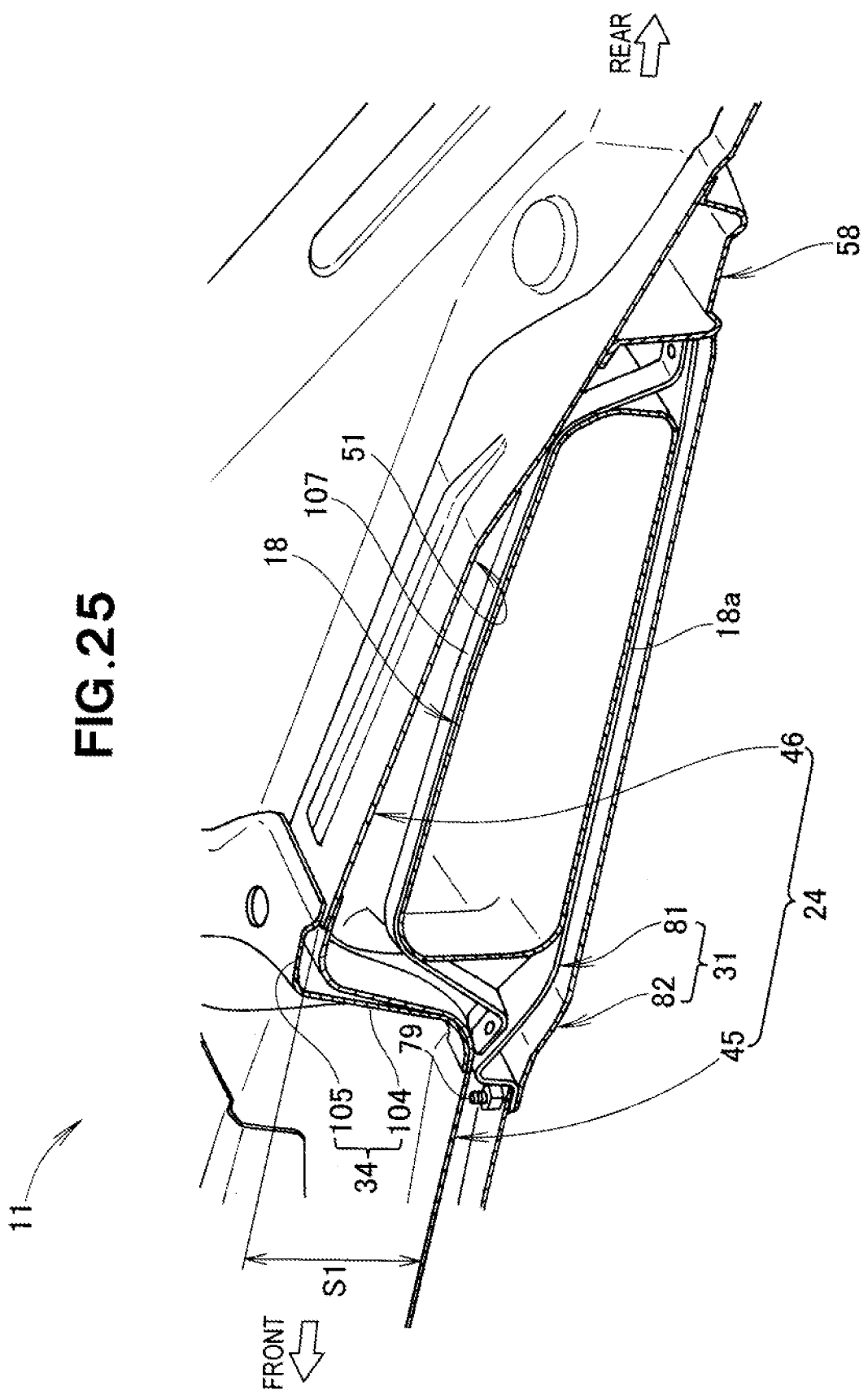
FIG. 25 is an enlarged cross-sectional view along line 25-25 in FIG. 18.
Figure 26:
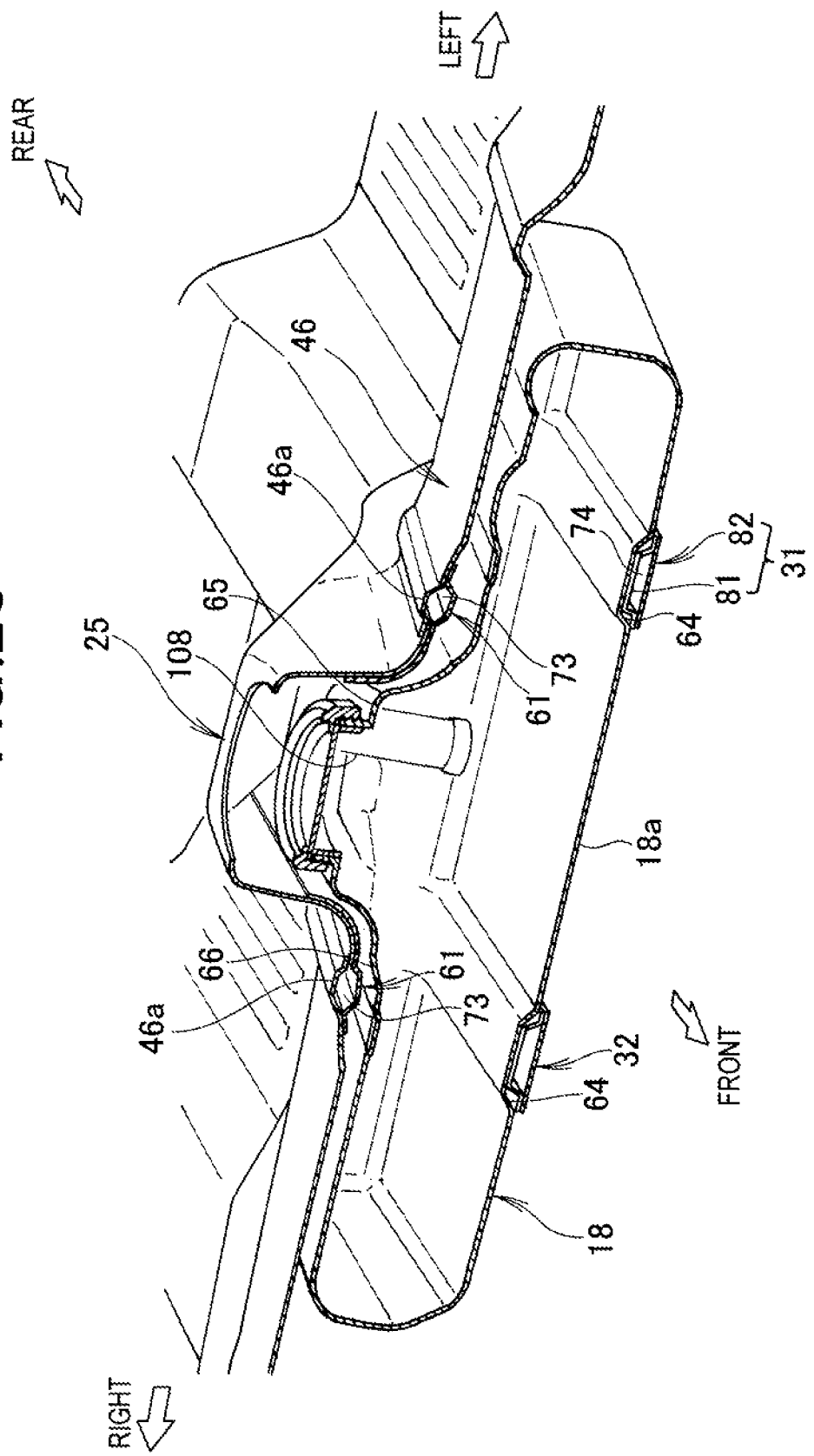
FIG. 26 is an enlarged cross-sectional view along line 26-26 in FIG. 18.

In the vehicle body structure according to the present invention, as illustrated in FIGS. 18 and 25, the floor frames 31, 32 are positioned below the fuel tank 18, but a large load can be applied to the tunnel section 25 (FIG. 2) and the thickness can be set to 1.0 t instead of the normal thickness 1.6 t. The structure contributes to reducing the burden on the floor frames 31, 32 and also reducing the weight.

Meanwhile, according to the structure of the related art (WO 2011/055695 A), the floor panel has the low strength and therefore it is necessary to extend the dispose the front floor extension fully up to the footrest section and provide reinforcement by disposing the front tunnel member on the rear side.

Figure 5:
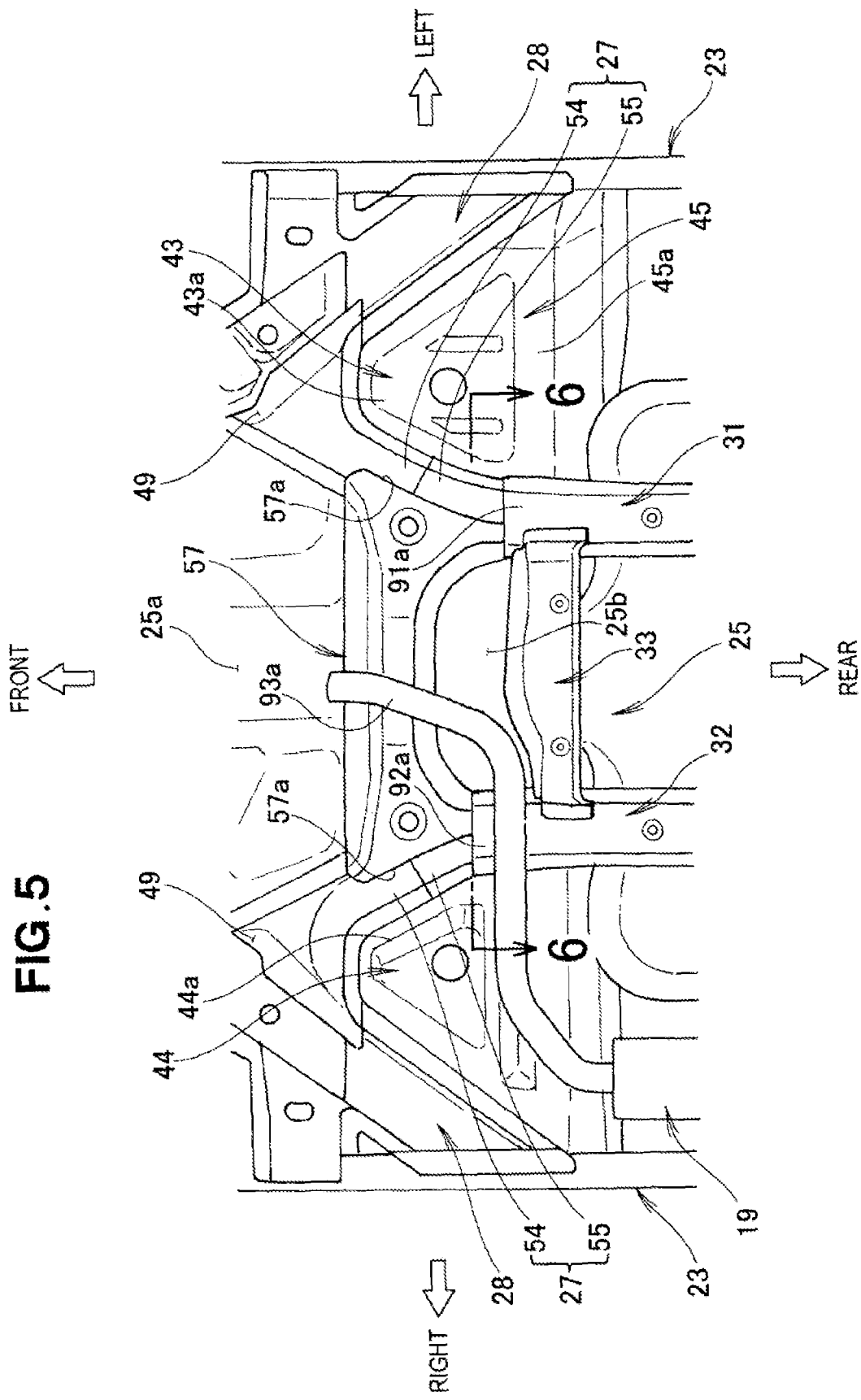
FIG. 5 is a bottom plan view of the front portion of the vehicle body shown in FIG. 1.

As illustrated in FIG. 5, a high-strength steel sheet exists between the front floor panel 45 and a branch section (branched section) 49 of the side sill extension 28 and the floor extension 27. In other words, since the high-strength steel sheet exists stretching from the front side frame 22 to the branch section of the side sill 23 and the floor frame 31 (32) (between the side sill extension 28 and the front floor extension 54), a substantially triangle-shaped high-rigidity body (including a peripheral portion of the reinforcing sections 43a, 44a) is formed, and the load can be transmitted from the center tunnel cross member 34 (FIG. 1) to the side sills 23, 23 on the rear side of the vehicle body via the high-strength steel sheet.

The bulging sections 51, 52 disposed on the left and right sides of the tunnel section 25 for installation of seats 47, 48 of the vehicle body 11 are formed on the rear floor panel 46, the left and right tunnel frames 61, 61 (see FIG. 9) extending in the front-rear direction of the vehicle body are formed inside the respective bulging sections 51, 52, and the energy container 18 is disposed below the bulging sections 51, 52 on the lower side of the vehicle body 11 (see FIGS. 1 and 2). On the rear floor panel 46, the seat supporting sections 62, 62 supporting the seats 47, 48 of the vehicle body 11 are disposed.

As illustrated in FIGS. 25 to 28, the energy container 18 includes recessed sections 64, 64 formed on a lower surface 18a and covered with the floor frames 31, 32, a projected section 65 formed in the center of the vehicle width direction and projecting upward, and an inclined surface 66 inclined such that the projected section 65 side comes at an upper position that corresponds to the outer side of the vehicle width of the projected section 65 and the tunnel frames 61, 61. Further, the energy container 18 includes a fuel pump 108 sending fuel to the inside and is fixed to the floor frames 31, 32 with tank bands 107, 107. The energy container 18 is disposed at the bulging sections 51, 52 on the lower side of the vehicle body 11 (FIGS. 1 and 2) and supported by the floor frames 31, 32.

Figure 10:
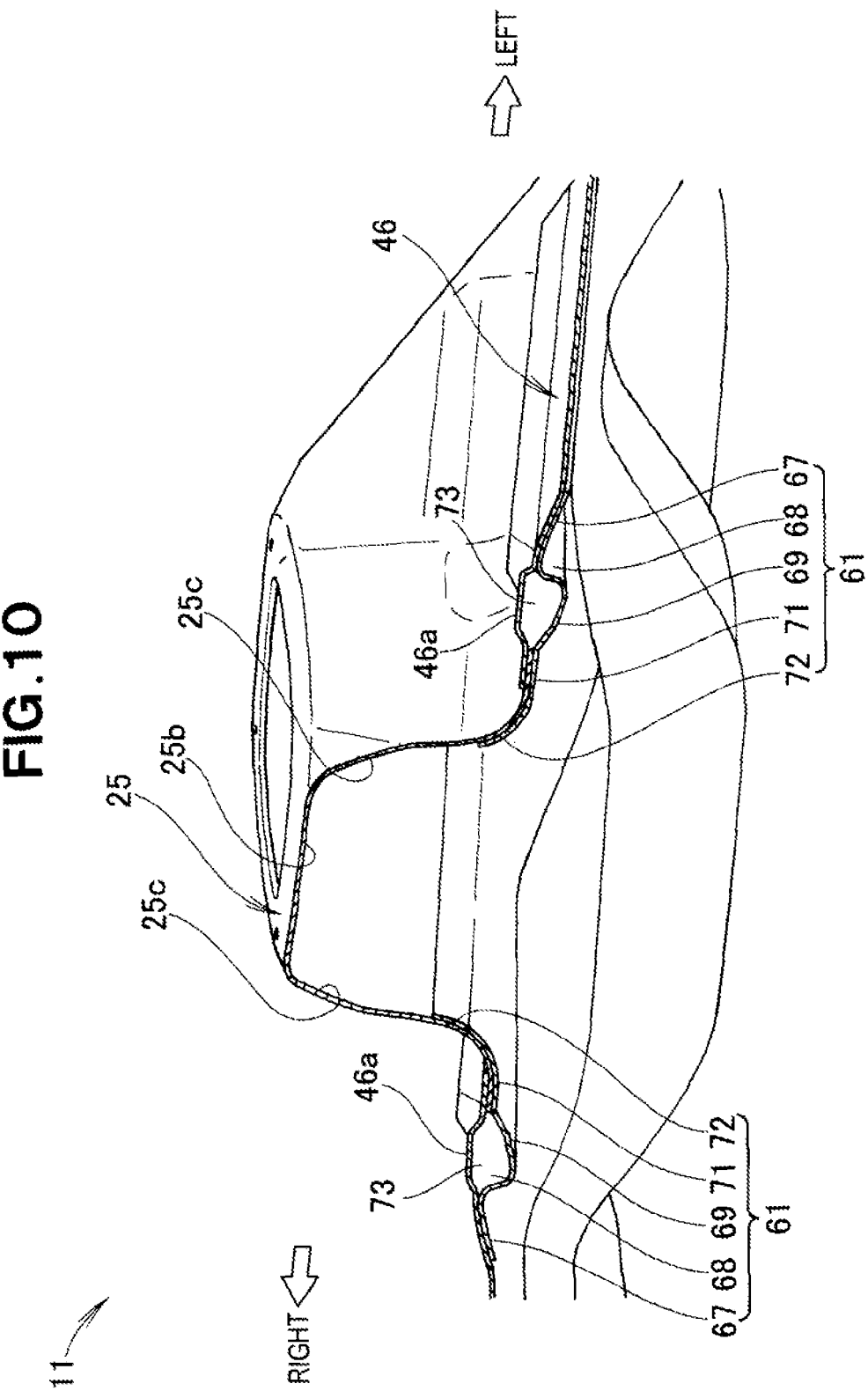
FIG. 10 is an enlarged cross-sectional view taken along line 10-10 in FIG. 9.
Figure 12:
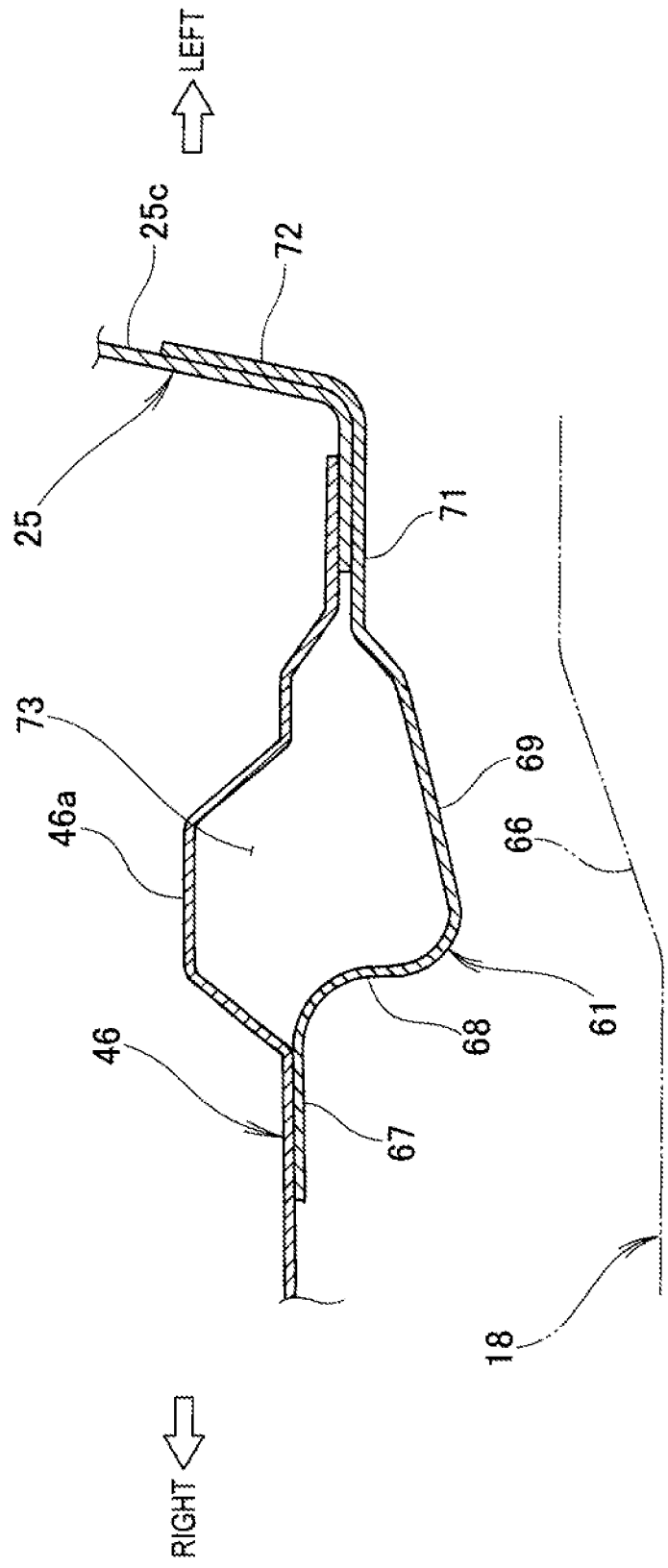
FIG. 12 is an enlarged cross-sectional view taken along line 12-12 in FIG. 9.

The tunnel frame 61 is formed of, as illustrated in FIGS. 10 and 12, an outer flange 67 formed along the rear floor panel 46, an outer vertical wall section 68 pending downward from the outer flange 67, an inclined section 69 inclined from the outer vertical wall section 68 to the rear floor panel 46 to approach, a horizontal section 71 extending from the inclined section 69 in the inner direction of the vehicle width along the rear floor panel 46, and an inner vertical section 72 formed along an inner wall 25c of the tunnel section 25 from the horizontal section 71.

Figure 15:
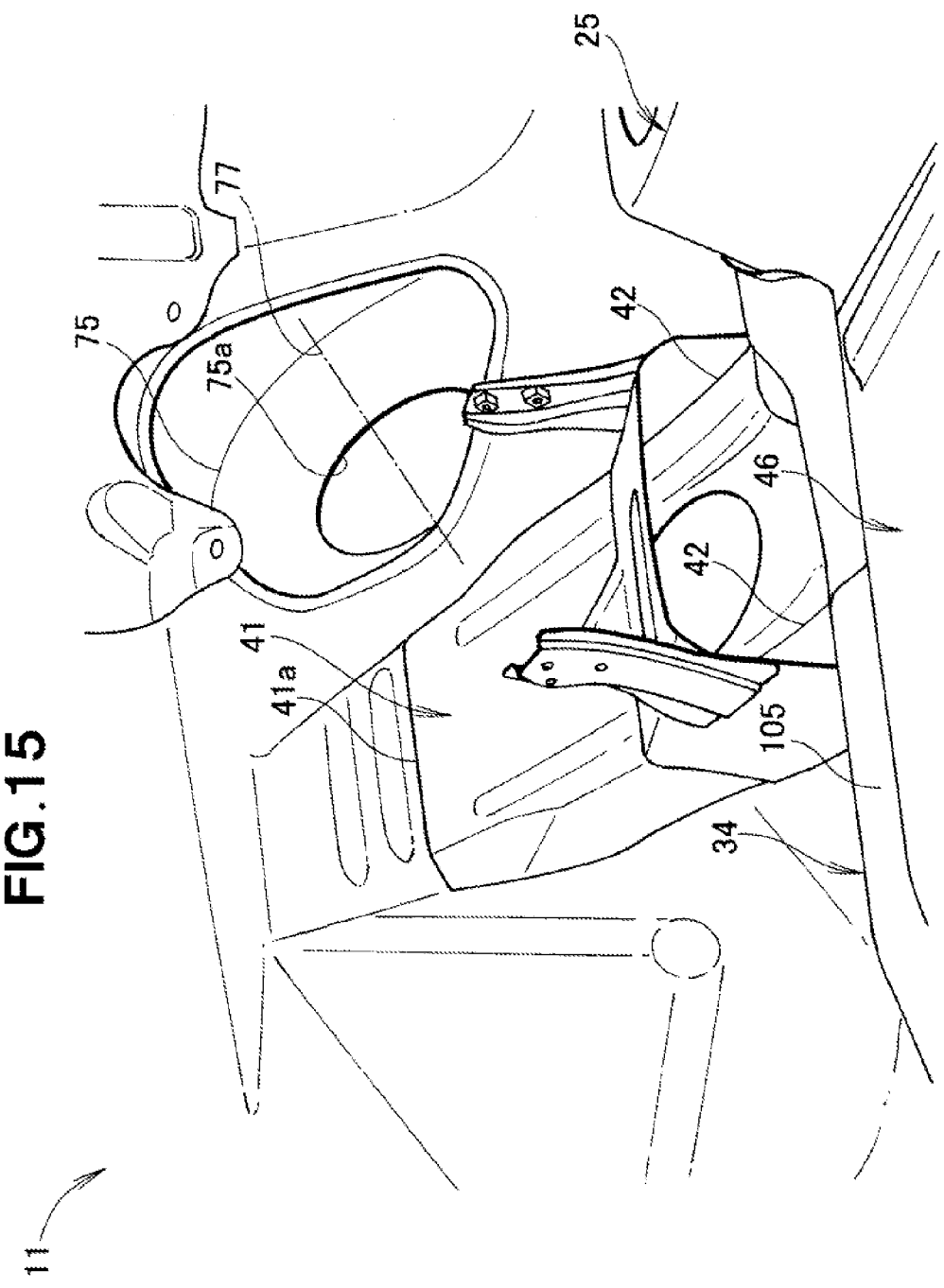
FIG. 15 is an enlarged view illustrating a periphery of a tunnel stiffener of the front portion of the vehicle body shown in FIG. 1.
Figure 17:
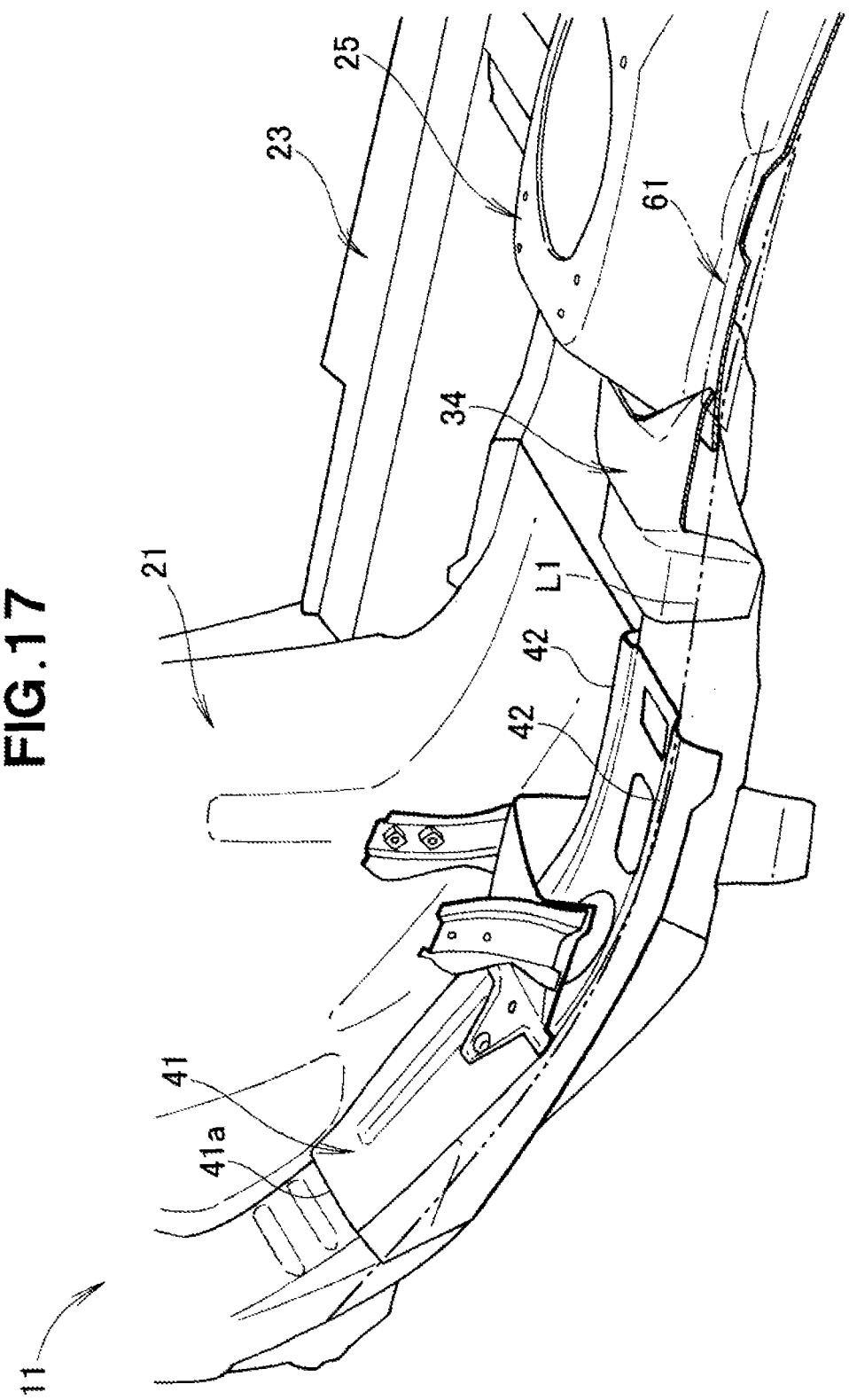
FIG. 17 is an enlarged cross-sectional view taken along line 17-17 in FIG. 16.

In other words, the tunnel frame 61 includes the inclined section 69 inclined substantially parallel to the inclined surface 66 of the energy container 18. Further, as illustrated in FIGS. 15 to 17, the tunnel frame 61 is disposed on a substantially extended line L1 linking the dashboard cross member 59 to tunnel stiffener 41 in a view from the vehicle width direction.

The tunnel frame 61 has, as illustrated in FIG. 12, an upper end (inner vertical section 72) joined with the inner side of the tunnel section 25 (inner wall 25c of the tunnel section 25). In other words, the tunnel frame 61 avoids deform of the rear floor panel 46 and protects the occupant by reinforcing the tunnel section 25 and by transmitting the load from the front side to the rear side (FIG. 10).

As illustrated in FIG. 10, a closed cross-section 73 is formed together with an upward-projecting groove 46a formed on the rear floor panel 46, thereby reinforcing the rear floor panel 46. With this structure, the load from the front side can be transmitted to the rear side and the rear floor panel 46 can be prevented from deforming. Moreover, there is an effect of preventing the rear floor panel 46 from bowing due to the weight of the occupants.

As illustrated in FIG. 3, rear ends 61b, 61b of the tunnel frames 61, 61 are joined to the rear ends 51a, 52a of the bulging sections 51, 52. In other words, the rear floor panel 46 is prevented from deforming by reinforcing the tunnel section 25 and by transmitting the load from the front side to the rear tunnel cross member 58 on the rear side.

As illustrated in FIG. 10, the tunnel frame 61 includes the outer vertical wall section 68, inclined section 69, horizontal section 71, and inner vertical section 72, and is formed in a recessed shape extending in the front-rear direction of the vehicle body. In other words, the rear floor panel 46 is prevented from deforming and appropriate strength against the load from the front side is secured by reinforcing the rear floor panel 46 and by transmitting the load from the front side to the rear tunnel cross member 58 (FIG. 3) on the rear side. A high tensile steel sheet (equivalent to JSC590R) having the thickness 0.6 t is used for material of the tunnel frame 61.

Figure 32:
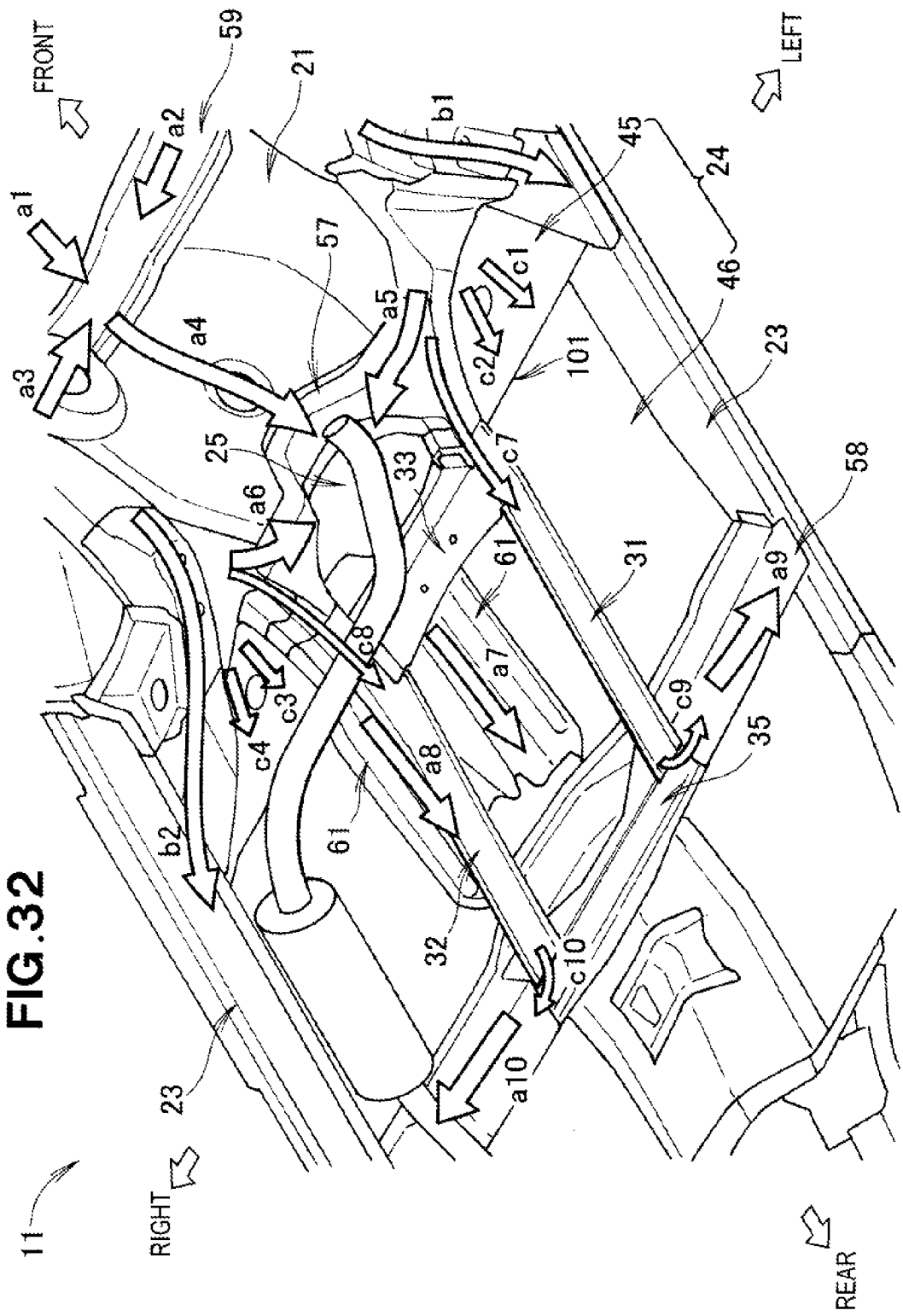
FIG. 32 is a view illustrating entire load transmission of the front portion of the vehicle body shown in FIG. 2.

As illustrated in FIG. 32, the tunnel frame 61 receives the load from the front floor extension 54 transmitted via the front floor panel 45.

The tunnel frame 61 does not directly receive transmission of the load that has been transmitted from the front side frame through the front floor extension in the same manner as the structure in the related art (WO 2011/055695 A). As illustrated in FIG. 11, the load transmitted to the side frame extension 26 as indicated by an arrow A1 is transmitted to the rear floor panel 46 through surface dispersion via the front floor panel 45 and the center tunnel cross member 34 (also see FIG. 1).

As a result, an entire portion of the front floor panel 45 having the high strength is pushed rearward as indicated by arrows A2 and A3, and therefore the rear floor panel 46 is prevented from deforming. Furthermore, with the above configuration, the load on the tunnel frame 61 (FIG. 10) is reduced, thereby achieving to reduce a vehicle body vertical width of the tunnel frame 61.

Next, a relation between the tunnel frame 61 and the fuel tank 18 will be described based on FIG. 13. In the case where a tunnel frame F1 bulges downward like the tunnel frame F1 indicated by a two-dot chain line in the structure of the related art, a low vehicle height is achieved by avoiding this bulging tunnel frame. Therefore, a recessed section on an upper surface of the fuel tank extends in the lower direction, and a published oil supply amount (fuel amount) is reduced.

In the vehicle body structure according to the present invention, the front floor panel 45 is configured to have the high strength and the load is reduced by decreasing the load transmission from the front floor extension 54 to the tunnel frame 61 as illustrated in FIG. 3, and therefore, the tunnel frame 61 can be formed thinner than the tunnel frame F1 in the structure of the related art.

Figure 13:
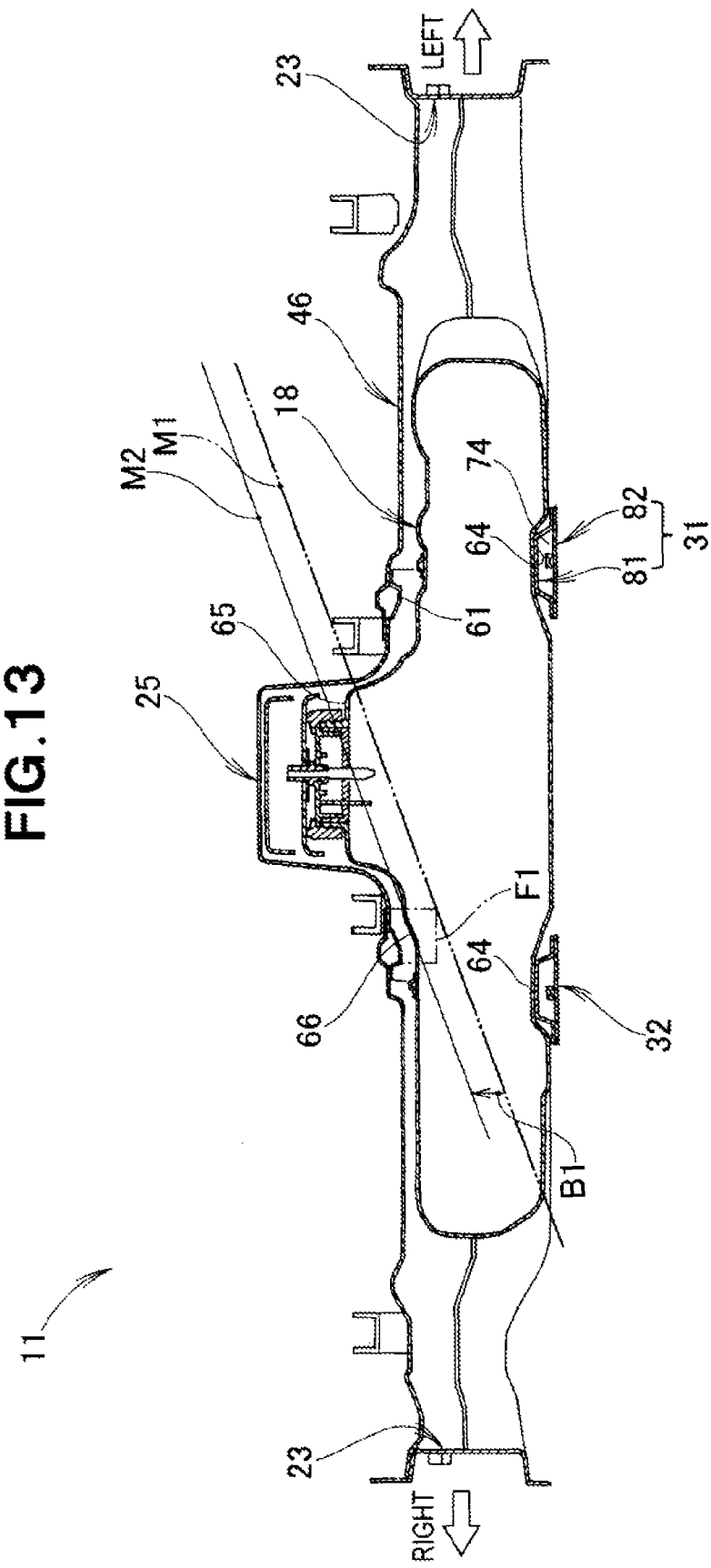
FIG. 13 is a cross-sectional view taken along line 13-13 in FIG. 2.

For example, as illustrated in FIG. 13, in the case where the vehicle body is inclined during refueling, a float not illustrated plugs an exhaust valve when a full-tank line M1 during the inclination reaches to the tunnel frame F1 in the structure of the related art and refueling cannot be continued. Therefore, the fuel cannot be supplied until the tank-full state. The lower surface of the tunnel frame 61 is inclined at a predetermined angle not to interrupt correct detection by a full-tank sensor (not illustrated) during refueling with the inclined surface, thereby achieving to avoid giving any influence to a position corresponding to the fuel tank 18 (unnecessary to form a deep recess). With this structure, the full-tank line M1 during the inclined condition indicated by the two-dot chain line according to the structure of the related art can be shifted, as illustrated by an arrow B1, to a full-tank line M2 during the inclined condition indicated by a solid line. As a result, the published supply oil amount (fuel amount) can be increased. In other words, the published value can be increased within the tank capacity without expanding the fuel tank 18.

As illustrated in FIG. 17, the tunnel frame 61 is disposed substantially on the extended line L1 of ridgelines 42, 42 from the dashboard cross member 59 to the tunnel stiffener 41 when viewed from the vehicle width direction so as to reduce the load burden on the tunnel frame 61. In other words, as illustrated in FIG. 3, when a load applied to the dashboard cross member 59 from the front side frames 22, 22 or a load applied to the dashboard cross member 59 due to backward movement of an engine (not illustrated) is transmitted to the tunnel section 25 of the floor panel 24, the tunnel section 25 can receive a larger load, and the load burden on the floor panel 24 and the tunnel frame 61 can be reduced.

As illustrated in FIGS. 14 and 15, the dashboard cross member 59 includes a cup-shaped joint cover 75 having an opening 75a for inserting a steering shaft 77, and a sub-cross member 76 extending from the joint cover 75 to an opposite side (side of the vehicle width center).

The dashboard cross member 59 is bridged between the left and right front side frames 22, 22, and therefore an impact load can be dispersed to the left and right sides. Particularly, the impact load can be surely absorbed even though there is the opening 75a for inserting the steering shaft 77.

A front end (upper end) 41a of the tunnel stiffener 41 is joined to the vehicle interior 12 side, continuous to the joining position of the dashboard cross member 59. With this structure, a load applied from the front side frames 22, 22 or by backward movement of the engine (not illustrated) can be transmitted to the high-strength tunnel section 25 in the event of front collision, and further it is possible to preventing the floor panel 24 (FIG. 3) from deforming. Furthermore, since the load is borne by the tunnel section 25, it results in reducing the load on the floor panel 24 and the tunnel frame 61.

Figure 19:
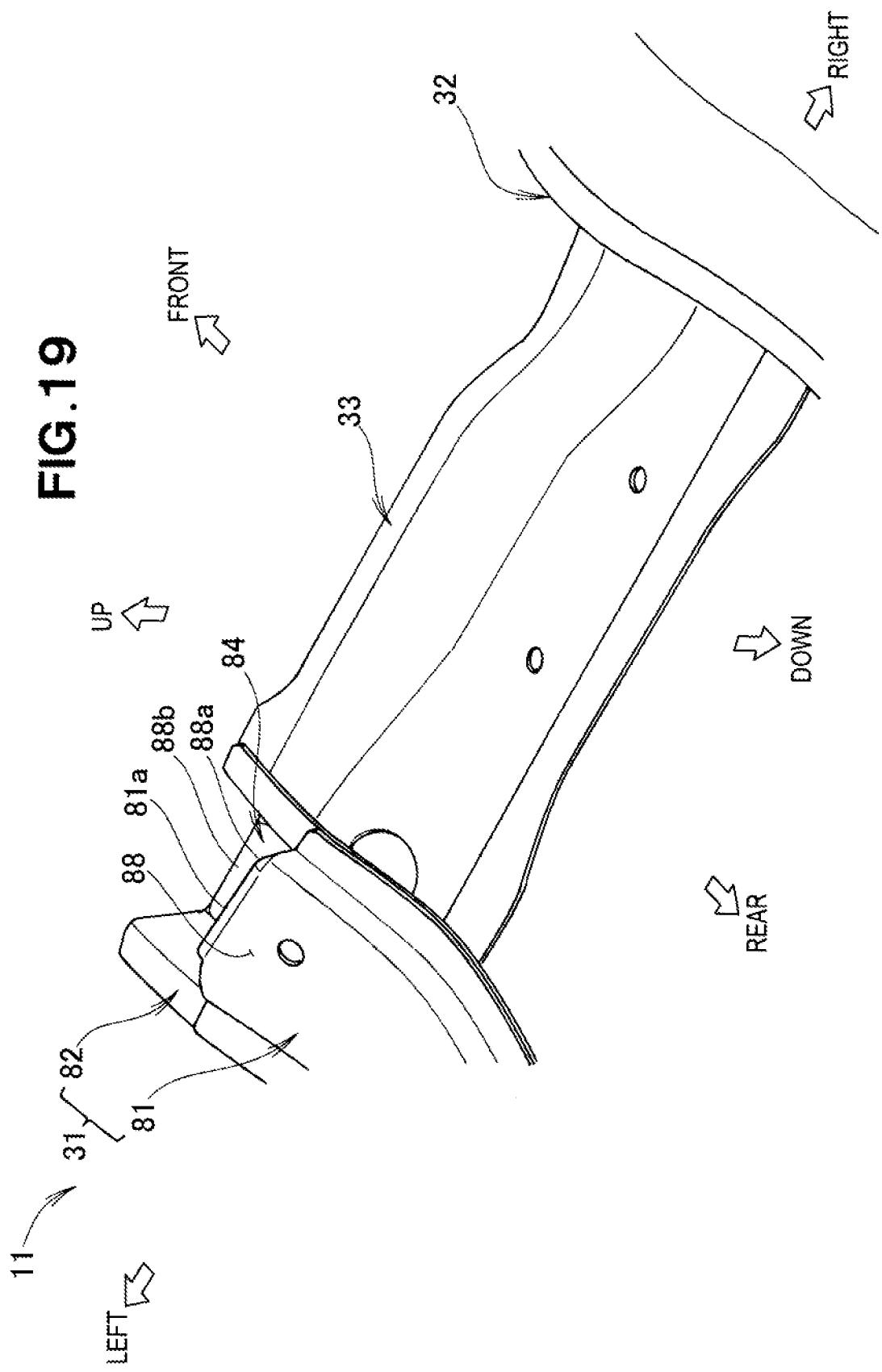
FIG. 19 is a perspective view of a periphery of a front floor cross member of the front portion of the vehicle body shown in FIG. 2 when viewed from above.

As illustrated in FIGS. 2 and 19, the front floor cross member 33 is an L-shaped member stretched between the floor frames 31, 32 and mounted so as to cover the front portion of the fuel tank 18. Also, a function of transmitting a load applied to one of the floor frames 31, 32 to the other one is provided.

A high-strength rectangular section (rectangular geometry section 78) is formed of the front floor cross member 33, the rear floor cross member 35, and left and right floor frames 31, 32. This structure prevents the rear floor panel 46 from deforming, thereby protecting both the occupant and the fuel tank 18. Because of the rectangular geometry, high rigidity is provided. The rectangular geometry section 78 is fixed to the floor extensions 27, 27 and the rear tunnel cross member 58, detachably from the lower side (FIG. 18).

As illustrated in FIG. 18, the front fixing sections 91a, 92a of the left and right, floor frames 31, 32 are fixed with bolts 79, 79 from the lower side at two points (left and right, positions). Rear fixing sections 91b, 92b of the left and right floor frames 31, 32 are fixed at two points (front and rear positions) from the lower side and at one point from the rear side to the front side. A high tensile steel sheet (high-strength steel sheet, equivalent to JSC590R) is used for the front floor cross member 33, rear floor cross member 35, and left and right floor frames 31, 32. The high tensile steel sheet having the thickness 1.0 t is used for the left and right floor frames 31, 32, the high tensile steel sheet having the thickness 1.2 t is used for the front floor cross member 33, and the high tensile steel sheet having the thickness 3.2 t is used for the rear floor cross member 35.

In other words, the floor frames 31, 32 extend so as to be bridged between the floor extension 27 (FIG. 3) and the rear tunnel cross member 58, and have a predetermined distance (FIG. 13) from the rear floor panel 46 (FIG. 3) in a vertical direction of the vehicle body. The floor frames 31, 32 are fixed detachably from the lower side of the vehicle body.

A front end of the left floor frame 31 is formed shorter than a front end of the right floor frame 32. Other sections are formed in the same manner. In the following, description will be given for the left floor frame 31 while omitting description for the right floor frame 32.

As illustrated in FIGS. 18 to 24, the floor frame 31 (32) includes a main body section 81 (FIG. 23) having a hat-like shape in a cross-sectional view and a lid section 82 to close the main body section 81. As illustrated in FIGS. 19 and 21, the main body section 81 includes a flange (vertical flange) 88a bent downward from a front end 81a of the main body section 81 and further extended to in the front direction to form a load receiving section 84. The load receiving section 84 is positioned so as to face the load transmitting section 83 when the floor frame 31 (32) is fixed to the vehicle body 11.

The load transmitting section 83 and the load receiving section 84 are formed as abutting surfaces respectively on the rear floor extension 55 and the floor frame 31 for load transmission through the high-strength steel sheet of the rectangular shape (parallel-crossing shape section 78) (FIG. 2). More specifically, lateral flanges 86a, 86a are extended from the vertical wall sections 86, 86 to the rear side of the rear floor extension 55 and mutually bent inward, and a rear flange 87a is extended from the a lower wall (bottom wall) 87 and bent upward, thereby forming the load transmitting section 83.

As illustrated in FIG. 21, an upper surface 88 of the floor frame 31 forming a closed cross-section 74 projected upward is bent downward to form the vertical flange 88a, and further bent forward to form a horizontal flange 88b. The vertical flange 88a and the horizontal flange 88b form the load receiving section 84. With this structure, the load receiving section and the load transmitting section face each other as the detachable members as well, and therefore the closed cross-section 74 does not open and load can be transmitted smoothly at the time of load transmission.

As illustrated in FIG. 18, the front fixing sections 91a, 92a of the floor frames 31, 32 are offset in the front-rear direction of the vehicle body by a distance D1 between the left and right, sides. With this structure, even in the case where the piping 93a, 93b of the muffler 19 (FIG. 2) is disposed on the front floor panel 45 with the step H1 illustrated in FIG. 6, it is possible to fix the piping with the plurality of bolts 79. Particularly, the fuel tank 18 can be automatically attached by the facility.

Figure 22:
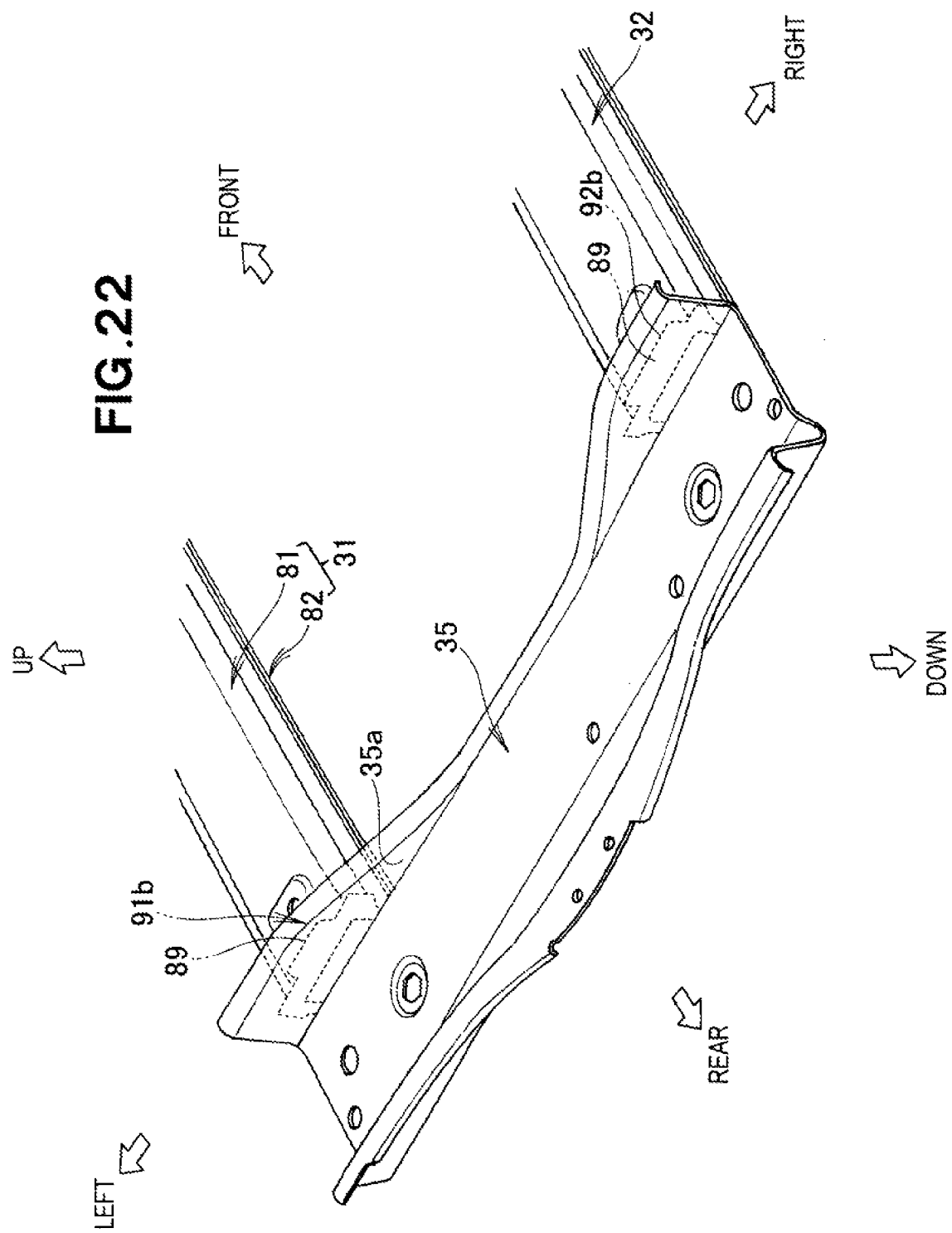
FIG. 22 is a perspective view illustrating a periphery of a rear floor cross member of the front portion of the vehicle body shown in FIG. 2.
Figure 23:
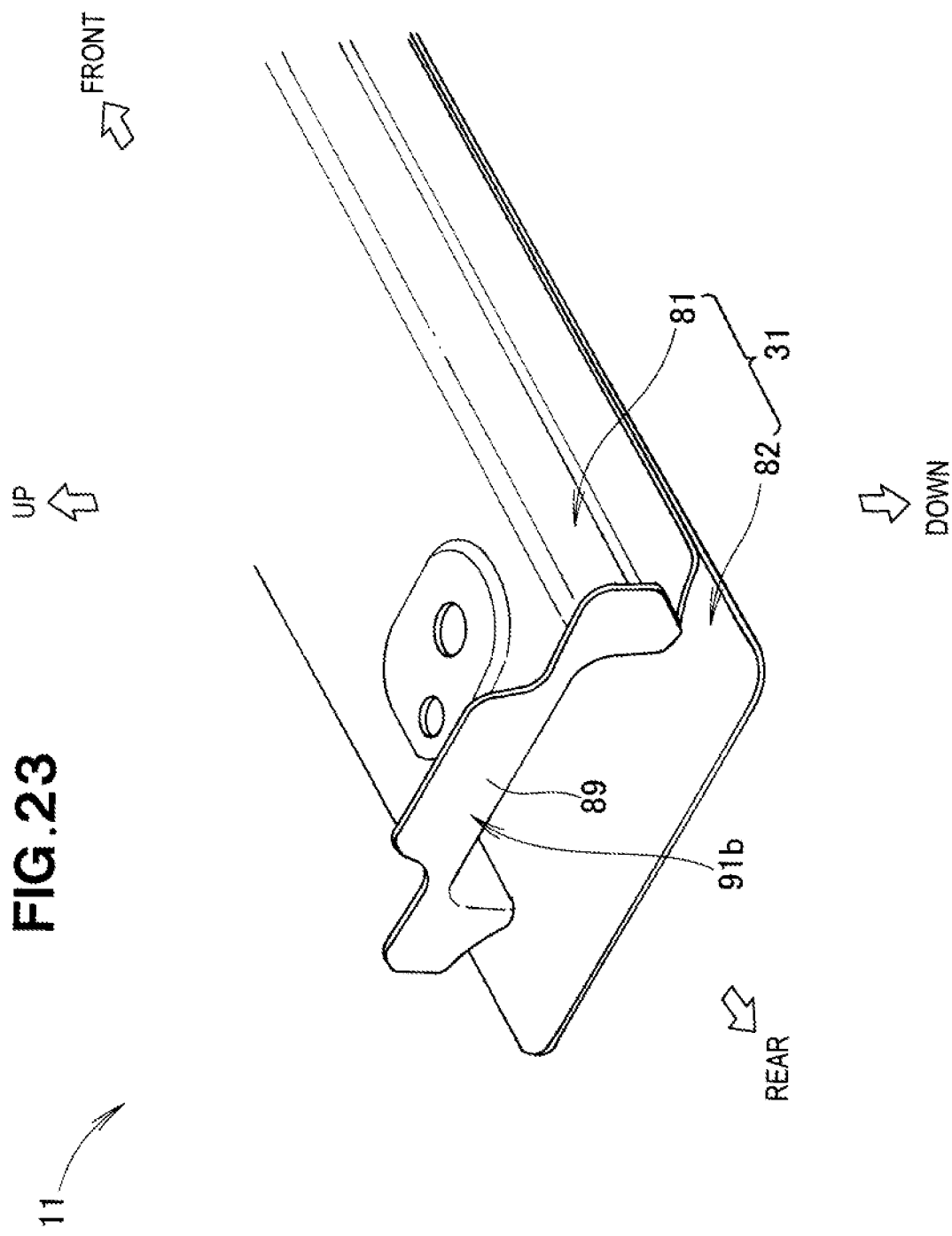
FIG. 23 is a perspective view of a floor frame of the front portion of the vehicle body shown in FIG. 2.

As illustrated in FIG. 22, the rear floor cross member 35 is formed in a recessed shape in a cross-sectional view (U-shape in the cross-sectional view). As illustrated in FIGS. 2 and 3, the rear floor cross member 35 is the high-strength member that transmits and sends loads from the floor frames 31, 32 to the side sills 23, 23. Also, the rear floor cross member can protect the fuel piping 94, 95 (FIG. 28) passing through the inner side of the rear tunnel cross member 58 and the center tunnel cross member 34 without deforming when the loads are applied because the rear floor cross member 35 is covered by the rear tunnel cross member 58 having the recessed shape in the cross-sectional view.

As illustrated in FIG. 22, a rear end flange 89 having an opening on the rear side opened in the outer and upper directions is formed at the rear end of the floor frame 31 and is joined to be fixed to a front wall 35a of the rear floor cross member 35. Since the rear end of the floor frame 31 (rear end flange 89) has an opening opened in the outer and upper directions and is joined to the rear floor cross member 35, the load from the floor frame 31 can be transmitted to the rear tunnel cross member 58 (FIG. 3) via the rear floor cross member 35.

Figure 24:
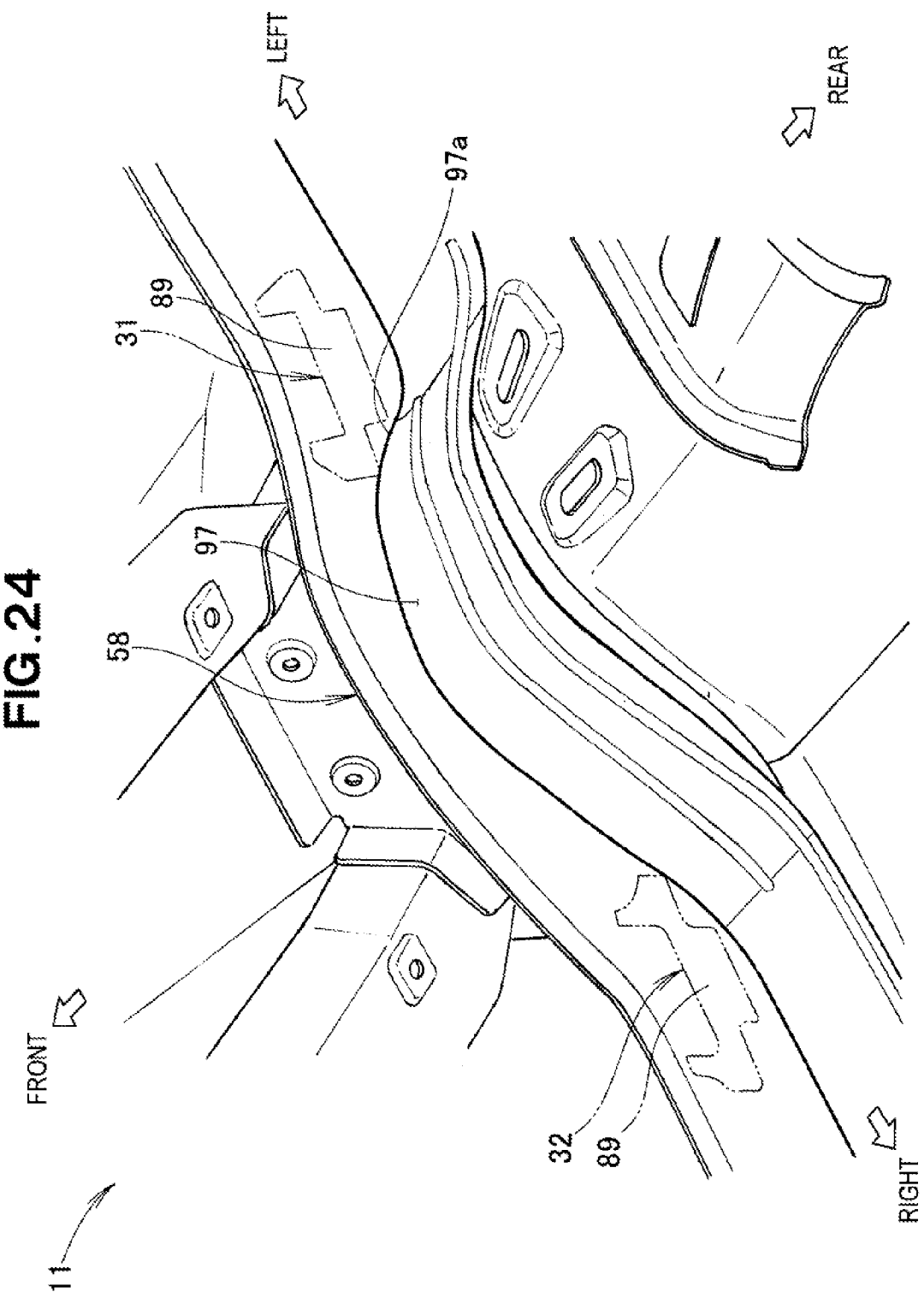
FIG. 24 is a perspective view illustrating a recessed section of a rear tunnel cross member of the front portion of the vehicle body shown in FIG. 2.

As illustrated in FIG. 24, ridgelines 97a, 97a of the recessed section 97 of the rear tunnel cross member 58 coincide with a position corresponding to a jointed region of the rear end (rear end flange 89) of the floor frame. In other words, the load is smoothly transmitted because the load is transmitted through the ridgelines 97a, 97a of the recessed section 97 at the time of load transmission. Moreover, there is an effect of supporting backward movement of the entire rectangular shape (rectangular geometry section 78) caused by the load.

As illustrated in FIGS. 21 and 22, the floor frame 31 is formed of the main body section 81 having the hat-like cross-section and the lid section 82 covering the main body section 81 on the thin closed cross-section 74, and the abutting surface (rear end flange 89) is formed on the rear end of the main body section 81, and therefore appropriate load transmission can be achieved even though curved downward.

In the vehicle body structure according to the present invention, as illustrated in FIGS. 1 and 2, the front floor panel 45 is configured to have the high strength and more load is transmitted to the side sills 23, 23 and the tunnel section 25, thereby achieving to reduce the load transmission from the front floor extension 54 to the floor frame 31 and reducing the load. Therefore, the floor frame can be formed thin. As a result, a low-height vehicle having lower hip points 47a, 48a of the seats 47, 48 can be achieved.

According to the structure of the related art (see U.S. Pat. No. 3,765,947), load transmission is not considered in a relation between the floor frame and the fuel tank. Accordingly, in the case where the floor frame is expanded in the upper direction to obtain high strength, a recessed section formed on the lower surface of the fuel tank is formed deeply in the upper direction in order to keep the vehicle height constant. Due to this structure, a fuel pump provided at the projected section of the center of the vehicle width cannot suction the fuel existing on more outer side than the recessed section, causing reduction of the published supply oil amount (fuel amount).

Figure 27:
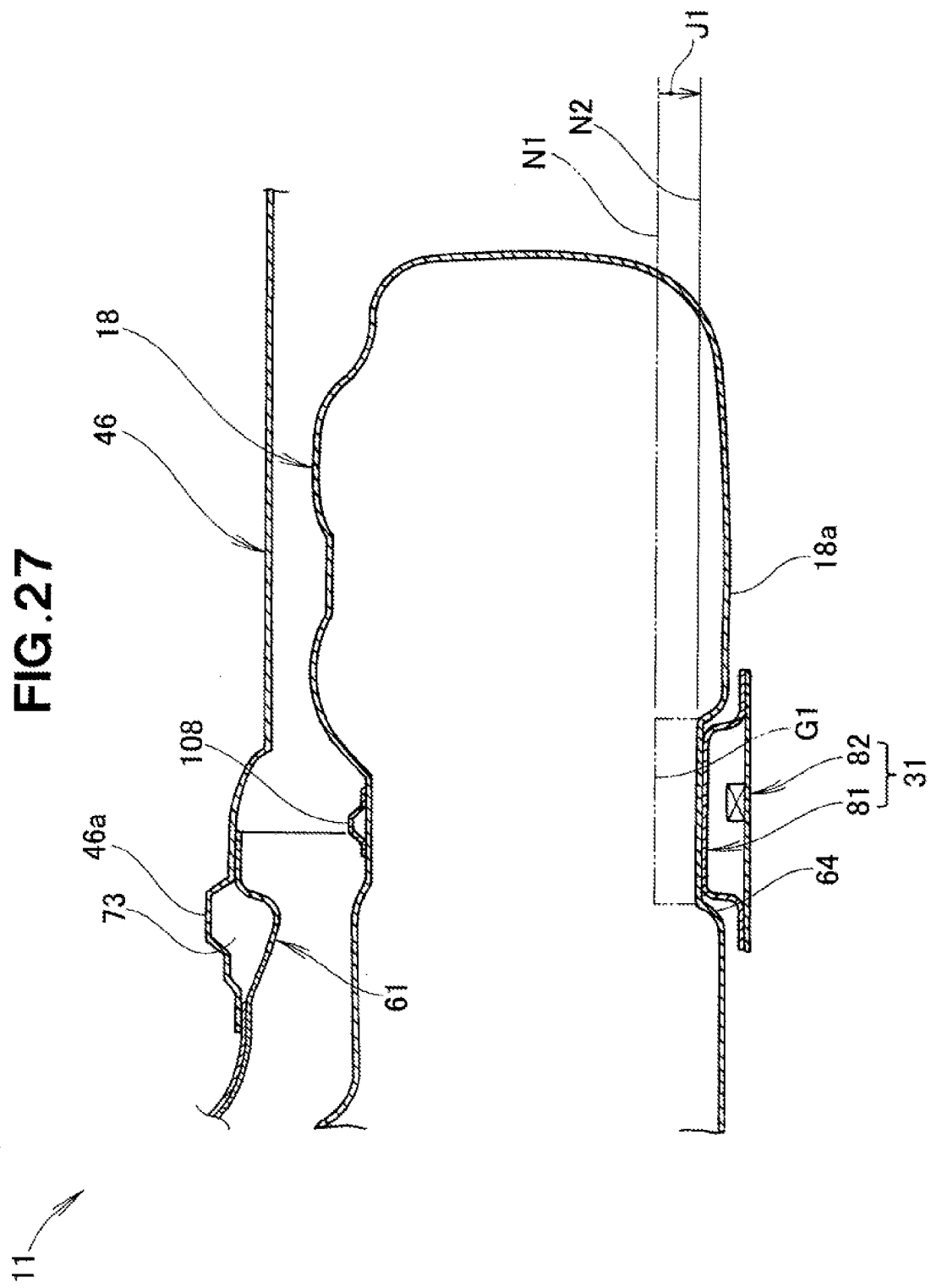
FIG. 27 is a cross-sectional view illustrating the periphery of the fuel tank illustrated in FIG. 2.
Figure 28:
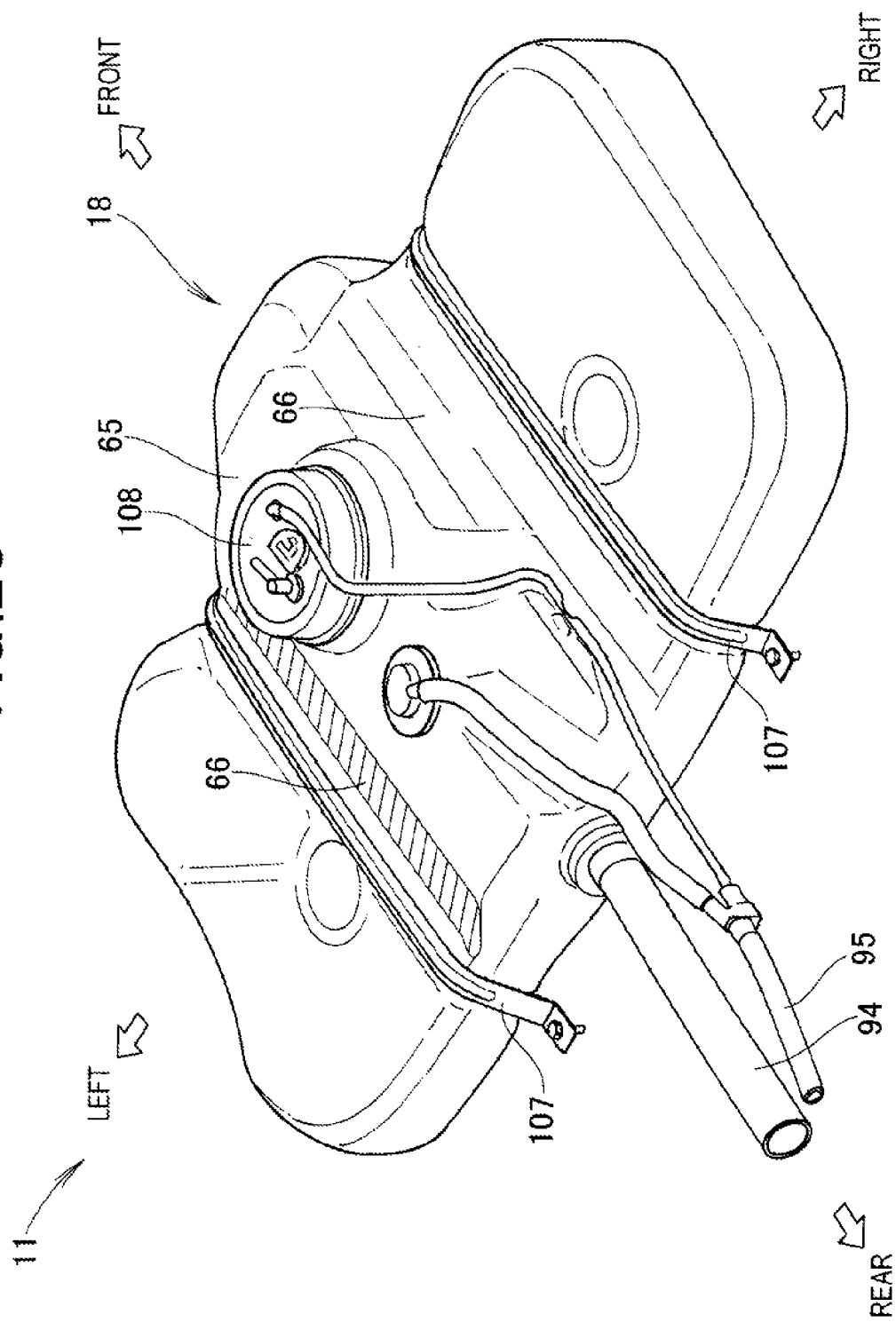
FIG. 28 is a perspective view of the fuel tank illustrated in FIG. 2.

In the vehicle body structure according to the present invention, as illustrated in FIG. 2, the front floor panel 45 is configured to have the high strength and more load is transmitted to the side sills 23, 23 and the tunnel section 25, thereby achieving to reduce the load transmission from the front floor extension 54 to the floor frame 31 and also achieving to reduce load received by the floor frame 31. As a result, as illustrated in FIG. 27, the floor frame 31 can be configured thin, and the recessed section 64 of the fuel tank 18 can be formed shallower than a recessed section G1 in the structure of the related art. With this structure, a line N2 capable of suctioning the fuel in the present application can be lowered below the fuel tank 18 from a line N1 capable of suctioning the fuel in the structure of the related art, as shown in an arrow J1. As a result, the published supply oil amount (fuel amount) can be increased.

Figure 29:
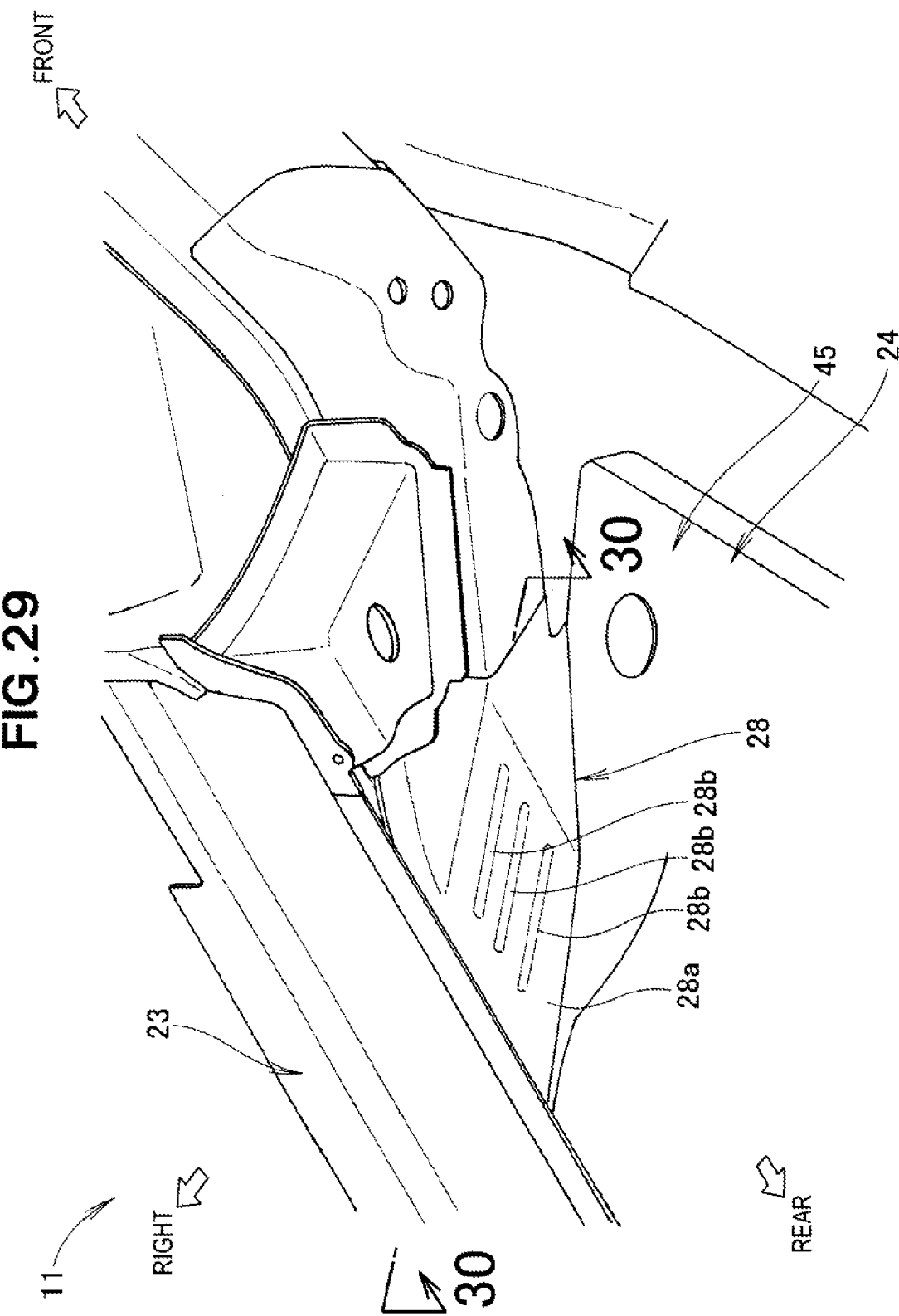
FIG. 29 is a perspective view showing a side sill of the front portion of the vehicle body illustrated in FIG. 2.
Figure 30:
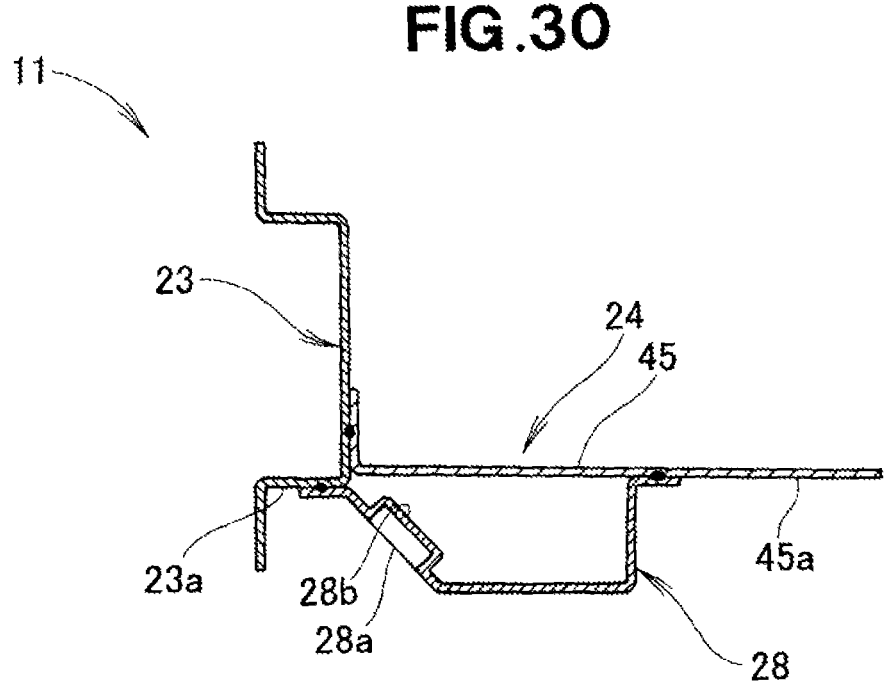
FIG. 30 is a cross-sectional view taken along line 30-30 in FIG. 29.
Figure 31:
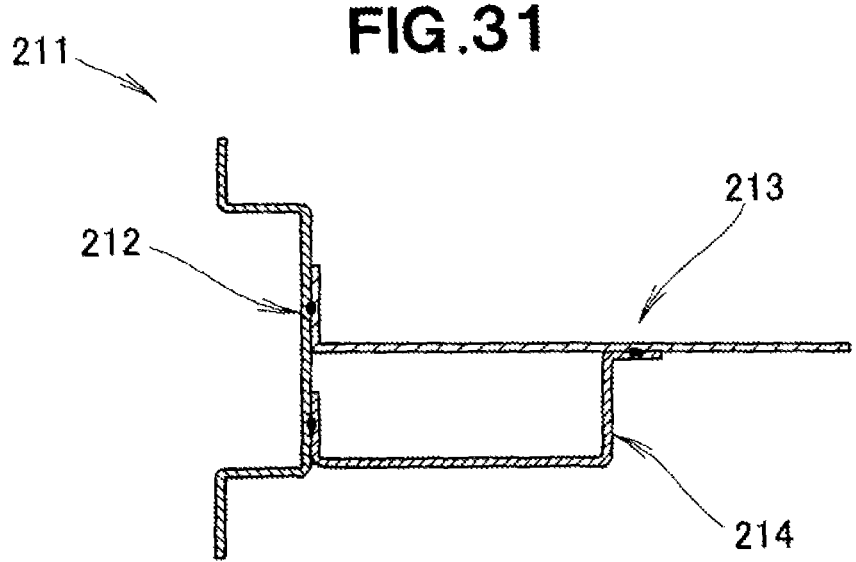
FIG. 31 is a cross-sectional view of the side sill of the front portion of the vehicle body in the structure of a related art.

As illustrated in FIGS. 2, 29, and 30, the left and right side sills 23, 23 are positioned at the rear side of the dashboard lower 21 and further positioned more outward of the vehicle width than the left and right front side frames 22, 22, extending in the front-rear direction of the vehicle body 11.

The side sill extensions 28, 28 are deflected toward the side sills 23, 23 from the rear ends 22a, 22a of the left and right front side frames 22, 22 along a lower surface 45a of the front floor panel 45.

According to the relation between the side sill 23 and the side sill extension 28 in the vehicle body structure of the present invention, an inclined surface 28a (FIGS. 29 and 30) is provided on a vehicle width outer surface of the side sill extension 28 and a reinforcing beads 28b are formed along the inclined surface 28a.

As illustrated in ng. 31, in a vehicle body 211 according to the structure of the related art (see WO 2011/055695 A), a position of a floor panel (footrest section) 213 in a side sill 212 is vertically high in the vehicle body, and therefore a side sill extension 214 can be disposed on the lower side.

In other words, as illustrated in FIGS. 2, 29, and 30, in the side sill extension 28, a position of the floor panel 24 (footrest sections 43, 44) in the in the side sill 23 is vertically low in the vehicle body, but the inclined surface 28a is provided on a side edge so as to be joined to a lower flange 23a of the side sill 23, and further the beads 28b extending outward along the inclined surface 28a is provided in view of reinforcement and load transmission efficiency to improve the strength, and therefore, a lowered floor and appropriate load transmission can be achieved.

Figure 7:
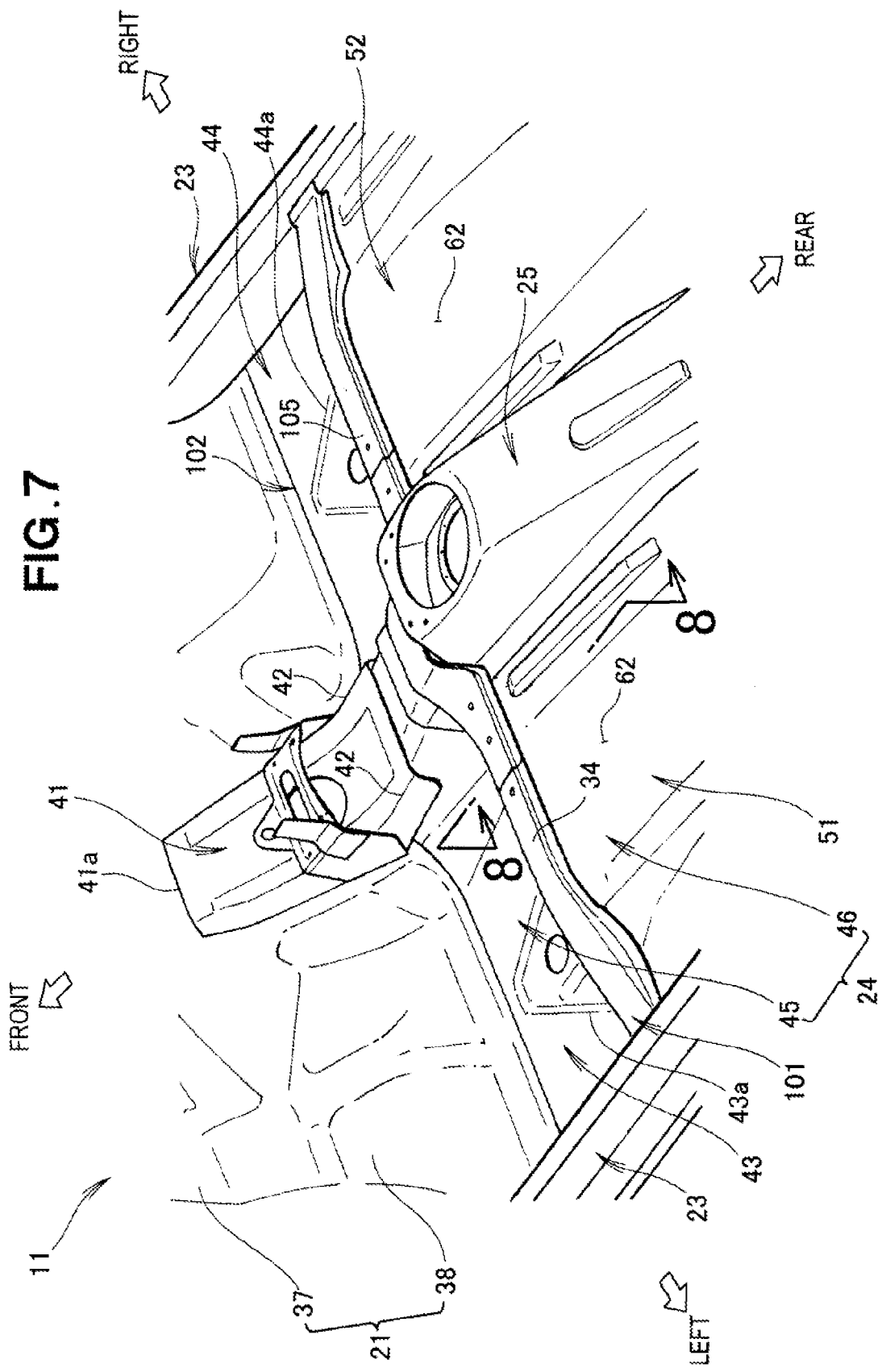
FIG. 7 is an enlarged view of a periphery of a front floor panel of the front portion of the vehicle body shown in FIG. 1.
Figure 8:
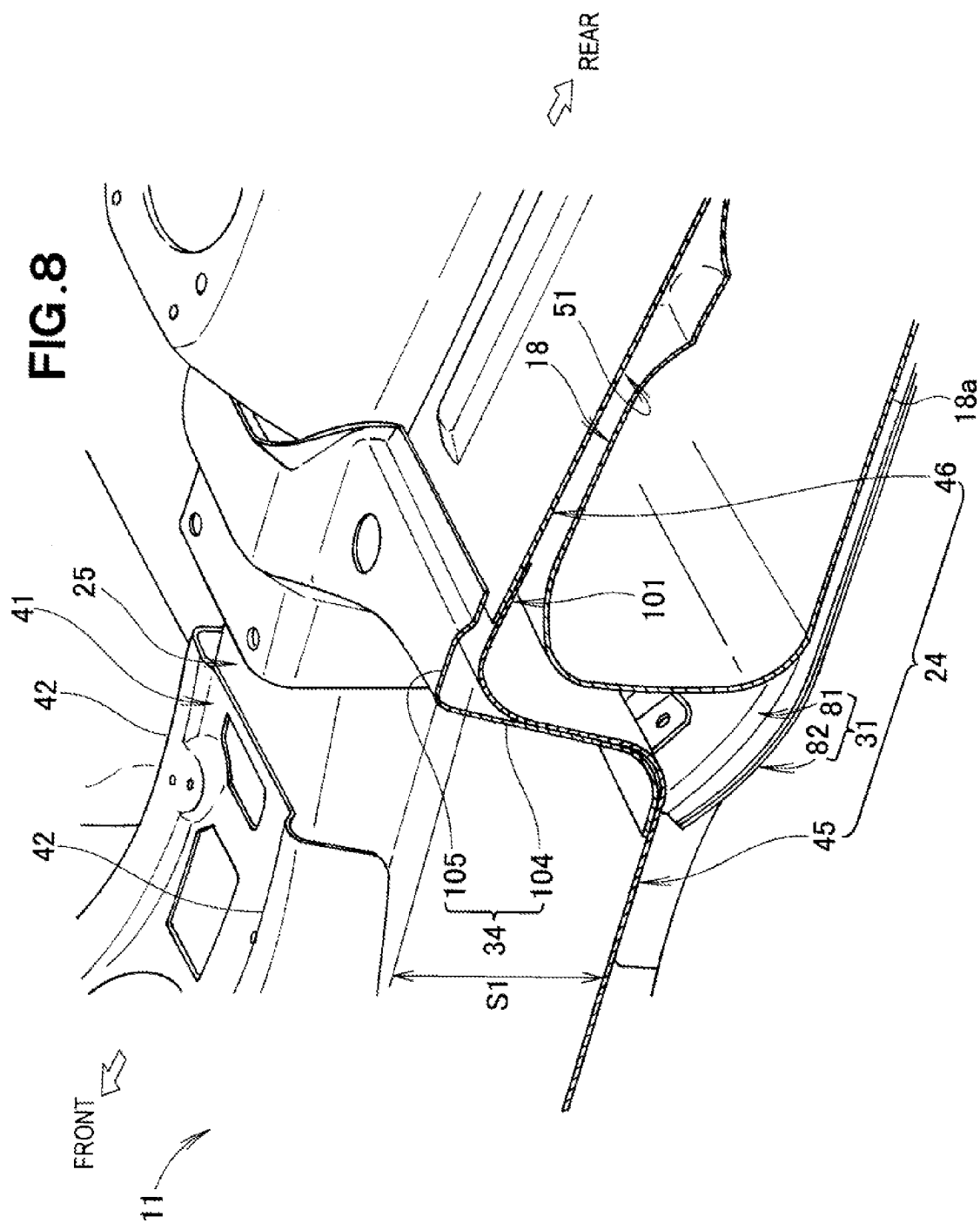
FIG. 8 is an enlarged cross-sectional view taken along line 8-8 in FIG. 7.

A center tunnel cross member 34 is, as illustrated in FIGS. 1, 7, and 8, bridged between the left and right side sills 23, 23 above a joint 101 of the front floor panel 45 and the rear floor panel 46. The center tunnel cross member 34 is an L-shape member in a side view, which includes a vertical wall 104 and a horizontal wall 105.

The center tunnel cross member 34 extends in the vehicle width direction above the joint 101 of the front floor panel 45 and the rear floor panel 46.

The center tunnel cross member 34 bulges upward between the footrest sections 43, 44 of the floor panel 24 and the hip points 47a, 48a of the seats 47, 48 on the rear side, and covers the front ends of the bulging sections 51, 52 from the front side, and therefore there is an effect of suppressing bending moment acting on the rear side due to the load from the front floor panel 45.

The center tunnel cross member 34 reduces the load applied to the floor panel 24 by transmitting, to the side sills 23, 23, the impact load flowing from the dashboard cross member 59 to the tunnel section 25. The center tunnel cross member 34 prevents the side sills 23, 23 from bending in the event of side impact or offset impact.

The center tunnel cross member 34 reinforces the tunnel section 25 as illustrated in FIG. 11. In the case where the load acts from the front floor panel 45 to the rear side of the vehicle body as indicated by the arrow A1, the load flows from the vertical wall 104 to the horizontal wall 105 of the center tunnel cross member 34 as indicated by the arrow A2 and can flow to the rear floor panel 46 as indicated by the arrow A3. With this structure, the load does not act on the fuel tank 18 disposed below the rear floor panel 46.

Figure 33:
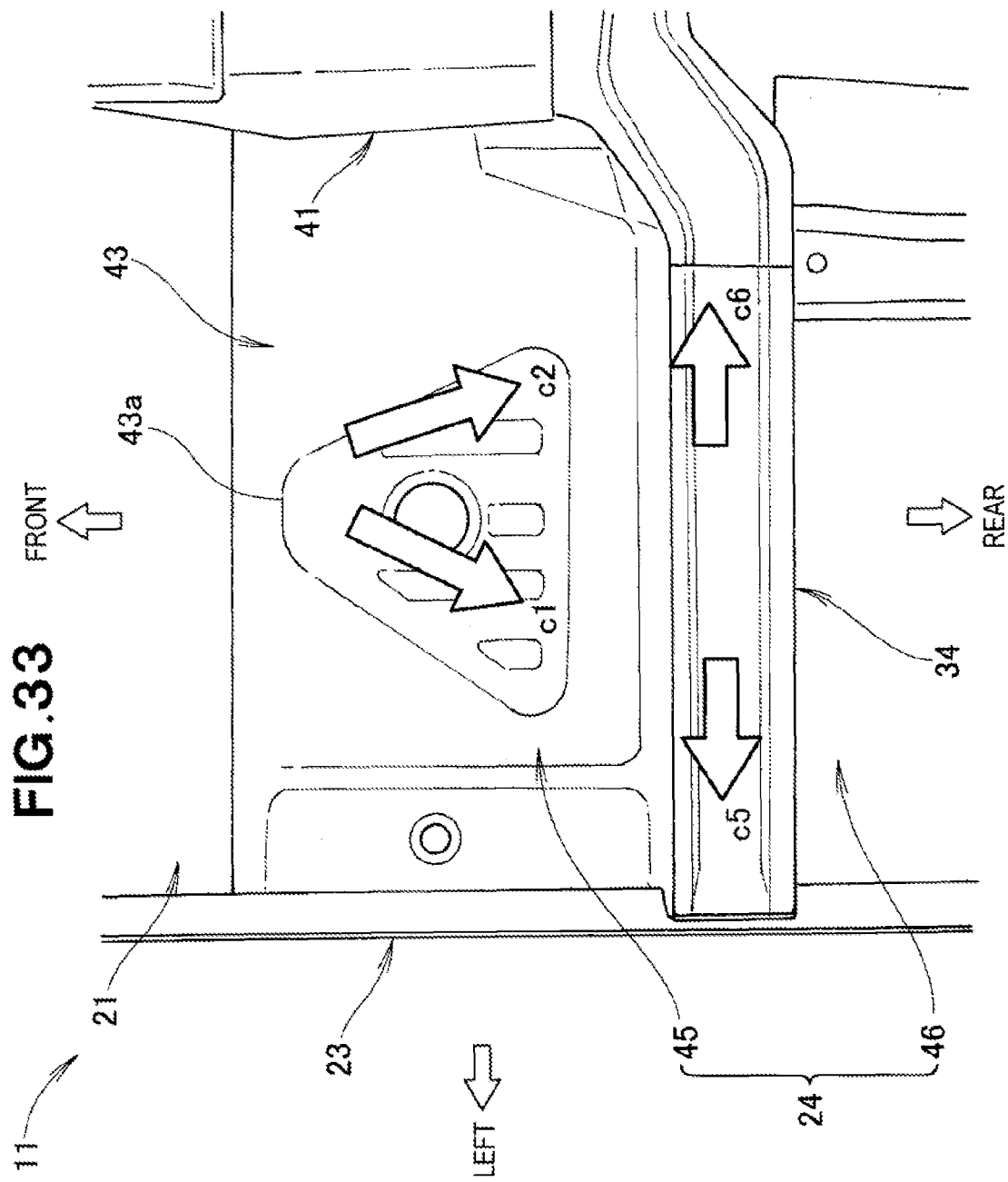
FIG. 33 is a top view illustrating load transmission of the front floor panel of the front portion of the vehicle body shown in FIG. 2.
Figure 34:
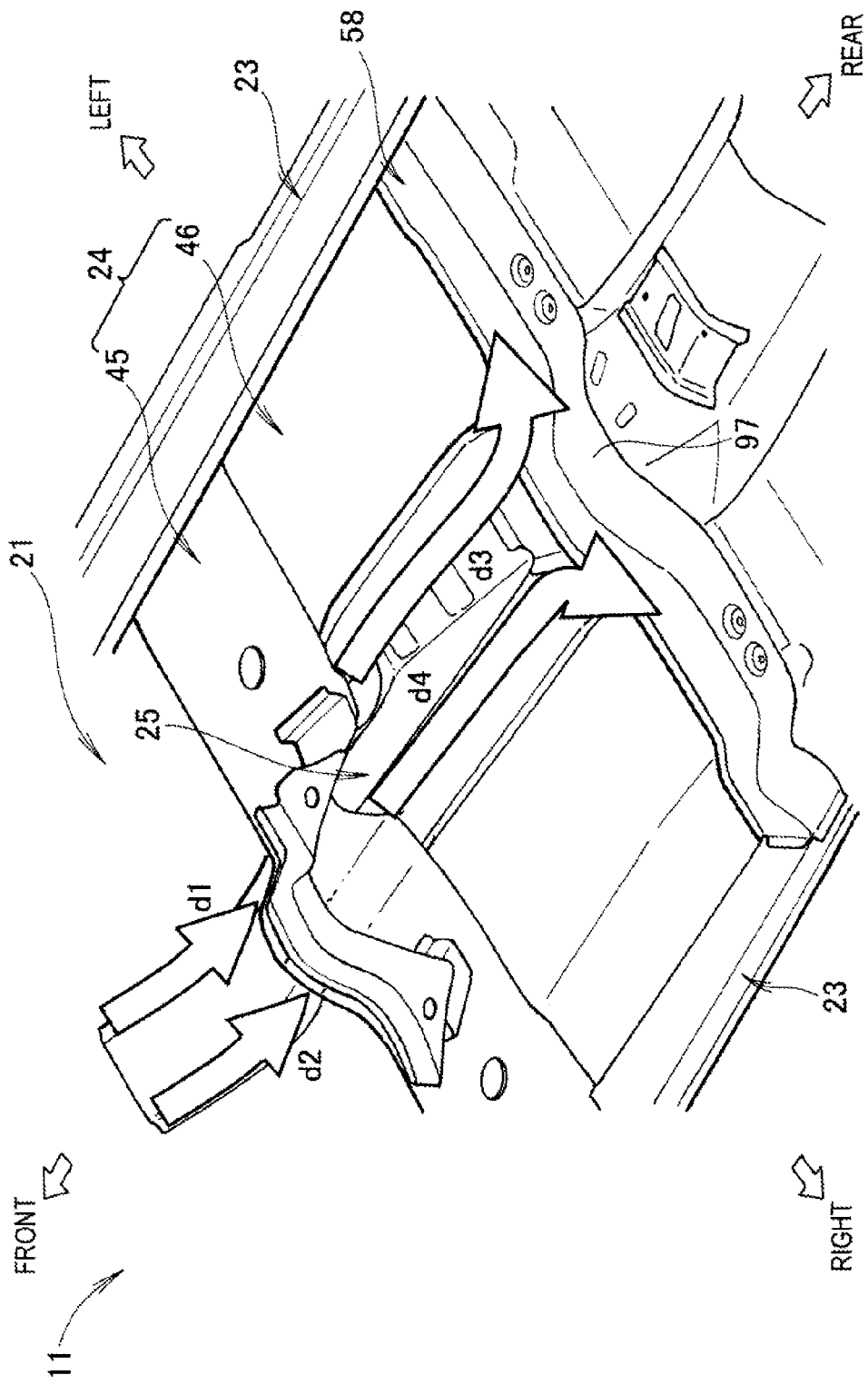
FIG. 34 is a view illustrating load transmission at a tunnel section of the front portion of the vehicle body shown in FIG. 2.

As illustrated in FIGS. 32 to 34, load transmission flow at the lower portion of the vehicle body 11 will be described. The thickness of an arrow represents an amount of the load transmission. As a base of the impact load absorption mechanism, a member to absorb a load as low strength, and a member to transmit the load as high strength without deforming are combined to establish an appropriate load absorption mode.

As illustrated in FIG. 32, an impact load acting from the front side like an arrow a1 and an impact load from the front side via the dashboard cross member 59 like arrows a2 and a3 between the front side frame 22 and the side sill 23 flow through the dashboard lower 21 as indicated by an arrow a4, and further transmits the load to the high-strength side sills 23, 23 via the side sill extensions 28, 28 as indicated by arrows b1 and b2. The load indicated by the arrows b1 and b2 is to be the largest load.

The load flowing through the dashboard lower 21 like the arrow a4 flows to the front tunnel cross member 57 like arrows a5 and a6 between the front side frame 22, the front tunnel cross member 57, the tunnel section 25 of the floor panel 24, and the rear tunnel cross member 58. Also, the load from the front floor extension 54 is transmitted to the tunnel frames 61, 61 via the front floor panel 45 like arrows a7 and a8, and then transmitted from the tunnel frames 61, 61 to the rear tunnel cross member 58 as arrows a9 and a10. This structure also bears the large load.

The impact load from the front side is transmitted from the front floor extension 54 to the floor frames 31, 32 as indicated by arrows c7 and c8 between the front floor extension 54, the rear floor extension 55, and the floor frame 31 (32). However, since a large proportion is borne by the side sills 23, 23 and the tunnel section 25, the burden is reduced, and the occupant can be protected without deforming the floor panel 24, and further the fuel tank 18 disposed below the rear floor panel 46 can be protected as well. The loads from the floor frames 31, 32 flow to the rear tunnel cross member 58 via the rear floor cross member 35 as indicated by arrows c9 and c10.

As illustrated in FIGS. 32 and 33, the impact load from the front side is transmitted from the front floor extension 54 to the footrest sections 43, 44 of the front floor panel 45 like arrows c1 to c4 in the front floor extension 54, front floor panel 45, and center tunnel cross member 34, and the load is transmitted to the side sills 23, 23 and the tunnel frames 61, 61 through surface dispersion via the center tunnel cross member 34 like arrows c5 and c6. Since a large proportion is borne by the side sills 23, 23 and the tunnel section 25, the burden is reduced, and the load is dispersed at the high-strength front floor panel 45 by the surface dispersion. Therefore, the tunnel frames 61, 61 and the floor frames 31, 32 can be formed thin.

As illustrated in FIG. 34, between the front side frame 22 or engine (not illustrated), dashboard cross member 59, tunnel stiffener 41, tunnel section 25 of the floor panel 24, and rear tunnel cross member 58, the impact load from the front side is transmitted from the dashboard cross member 59 as indicated by arrows d1 and d2 to the high-strength tunnel section 25 and the rear tunnel cross member 58 via the tunnel stiffener 41 provided on the vehicle interior side as indicated by arrows d3 and d4. This structure also bears the large load.

As illustrated in FIGS. 1 to 3, the vehicle body structure includes the left and right front side frames 22, 22 positioned at the front portion of the vehicle body 11 and extending in the front-rear direction of the vehicle body 11, the dashboard lower 21 that is positioned at the rear side of the left and right front side frames 22, 22 and divides the vehicle body 11 into the front and rear portions, the floor panel 24 extending in the vehicle width direction of the vehicle body 11 and stretched from the lower portion of the dashboard lower 21 in the rear direction, and the tunnel section 25 stretched from the center of the vehicle width and the lower end of the dashboard lower 21 to the rear portion of the floor panel 24 and bulging upward from the floor panel 24.

The floor panel 24 includes the bulging sections 51, 52 disposed on left and right sides of the tunnel section 25 for installation of the seats 47, 48 of the vehicle body 11, and the rear tunnel cross member 58 extending in the vehicle width direction at the rear ends 51a, 52a of the bulging sections 51, 52. The vehicle body 11 includes the left and right floor extensions 27, 27 deflected toward the tunnel section 25 along the lower surface 21a of the dashboard lower 21 from the rear ends 22a, 22a of the left and right front side frames 22, 22, the floor frames 31, 32 extending so as to be bridged between the floor extensions 27, 27 and the rear tunnel cross member 58 and having a predetermined distance from the rear floor panel 46 in the vehicle body vertical direction, and an energy container 18 disposed below the bulging sections 51, 52 of the vehicle body 11 and supported by the floor frames 31, 32. The floor frames 31, 32 are fixed detachably from the lower side of the vehicle body.

In other words, since the energy container 18 supported by the floor frames 31, 32 can be detachably fixed from the lower side of the vehicle body, work efficiency is greatly improved, compared to the related art in which fixing is fixed by a tank band. Particularly, the energy container 18 can be automatically attached by a facility machine.

The floor frames 31, 32 extend so as to be bridged between the left and right floor extensions 27, 27 and the rear tunnel cross member 58, and therefore the floor panel 24 is prevented from deforming and the occupant can be protected, and simultaneously the energy container 18 can be protected from the impact load. Further, the impact load applied from the left and right front side frame 22, 22 can be transmitted to the floor frames 31, 32 via the left and right floor extensions 27, 27, and therefore the floor panel 24 can be prevented from deforming to protect the occupant.

As illustrated in FIGS. 1 to 3, in to the vehicle body structure, the vehicle body 11 includes the front tunnel cross member 57 that is bridged between the left and right floor extensions 27, 27 and extends in the vehicle width direction along the lower surface 25b of the tunnel section 25 near the joint 102 of the dashboard lower 21 and the floor, panel 24. The floor panel 24 is divided into the front floor panel 45 including footrest sections 43, 44 on the front side and the rear floor panel 46 on the rear side of the vehicle body 11. The footrest sections 43, 44 are disposed on left and right sides of the tunnel section 25 in a bulging manner to the lower side of the vehicle body 11 at positions corresponding to feet of occupants riding on the vehicle body 11. The rear floor panel 46 includes the bulging sections 51, 52. The front floor panel 45 has the strength higher than the rear floor panel 46.

In other words, the front floor panel 45 is configured to have the high strength, and the front tunnel cross member 57 is provided between the left and right floor extensions 27, 27 near the joint 102 of the dashboard lower 21 and the floor panel 24, and therefore, the larger load can be received and burden on the floor frames 31, 32 can be reduced when the load applied to the front side frames 22, 22 is transmitted to the left and right floor extensions 27, 27 and the tunnel section 25 of the floor panel 24.

Since the front floor panel 45 is configured to have the high strength, when the load is applied, the load can be transmitted to the rear side of the vehicle body through surface dispersion without concentrating the load and causing deform, and the feet of the occupant can be protected.

Since the front floor panel 45 is configured to have the high strength and the front tunnel cross member 57 is configured to receive larger load by the tunnel section 25, it is possible to eliminate a framework member extending in the front-rear direction of the vehicle body, generally required to secure rigidity, thereby contributing to weight reduction.

Since the front floor panel 45 is configured to have the high strength and the front tunnel cross member 57 is provided between the left and right floor extensions 27, 27 near the joint 102 of the dashboard lower 21 and the floor panel 24, when the load applied to the front side frames 22, 22 is transmitted to the left and right floor extensions 27, 27 and the tunnel section 25 of the floor panel 24, the larger load can be received and the burden on the floor frames 31, 32 can be reduced. Therefore, the floor frame may have the thickness enough to receive the load transmitted to the front floor panel 45 and having the reduced burden, thereby contributing to lowering the floor of the vehicle body 11 (lowering the vehicle height).

Since the front floor panel 45 is configured to have the high strength and the front tunnel cross member 57 is provided between the left and right floor extensions 27, 27 near the joint 102 of the dashboard lower 21 and the floor panel 24, the larger load can be received when the load applied to the front side frames 22, 22 is transmitted to the left and right floor extensions 27, 27 and the tunnel section 25 of the floor panel 24. Therefore, since the burden on the floor frames 31, 32 can be reduced, the floor frame may have the thickness enough to receive the load transmitted to the front floor panel 45 and having the reduced burden, thereby giving small influence of the floor frames 31, 32 to the energy container 18 (height of the recessed section 64 on the lower surface 18 of the energy container 18). Further, the published supply oil amount (fuel amount) can be increased because there is no possibility where the fuel pump 108 (FIG. 26) provided at the center of the vehicle width cannot suction the fuel existing more outer side than the recessed section 64 to result in reducing substantial capacity of the energy container 18.

In the vehicle body structure, as illustrated in FIGS. 19 to 21, the floor extension 27 includes the load transmitting section 83 formed with the recessed cross-section by closing the rear ends 86b, 86b of the left and right vertical wall sections 86, 86 inward. The floor frames 31, 32 is formed of the main body section 81 having the hat-like cross-section and the lid section 82 covering the main body section 81, and the load receiving section 84 is formed by bending the flange (vertical flange) 88a downward from the front end 81a of the main body section 81 and further extending the same in the front direction. The load transmitting section 83 and the load receiving section 84 are positioned so as to face each other when the floor frames 31, 32 are fixed to the vehicle body 11.

In other words, since the load transmitting section 83 and the load receiving section 84 are positioned to face each other when the floor frames 31, 32 are fixed to the vehicle body 11, the burden is reduced by the front tunnel cross member 57 and the tunnel section 25 when the impact load is applied from the front side to the vehicle body 11, thereby achieving appropriate load transmission as the hollow hat-like cross-section.

The appropriate load transmission can be achieved even when the floor frames 31, 32 supporting the energy container 18 (see FIG. 2) are curved lower than the fixing position of the floor extension 27 of the floor frames 31, 32. Therefore, the floor of the vehicle body 11 can be lowered or the capacity of the energy container 18 can be expanded.

In the vehicle body structure, as illustrated in FIGS. 1 to 3, the vehicle body 11 includes: the left and right, side sills 23, 23 positioned on the rear side of the dashboard lower 21 and further positioned more outward of the vehicle width than the left, and right front side frames 22, 22, extending in the front-rear direction of the vehicle body 11; the side sill extensions 28, 28 deflected toward the side sills 23, 23 along the lower surface 45a of the front floor panel 45 from the rear ends 22a, 22a of the left and right front side frames 22, 22; and the center tunnel cross member 34 bridged between the left and right side sills 23, 23 above the joint 101 of the front floor panel 45 and the rear floor panel 46. The front floor panel 45 includes the footrest sections 43, 44 between the floor extensions 27, 27 and the side sill extensions 28, 28.

In other words, the large load can be borne by connecting the load applied from the left and right front side frames 22, 22 to the left and right side sills 23, 23 via the side sill extensions 28, 28, thereby reducing the burden on the floor panel 24 and the floor frames 31, 32.

Since the high-strength footrest sections 43, 44 (front floor panel 45) are disposed between the floor extensions 27, 27 and the side sill extensions 28, 28 and the center tunnel cross member 34 is disposed above the joint 101 of the front floor panel 45 and the rear floor panel 46, the load transmitted to the front floor panel 45 having the reduced burden by being connected to the left and right side sills 23, 23 is transmitted to the left and right side sills 23, 23 via the tunnel cross member 34. Further, the floor frames 31, 32 may have the thickness enough to receive the load having the reduced burden, thereby contributing to lowering the floor of the vehicle body 11.

Since the high-strength footrest sections 43, 44 (front floor panel 45) are disposed between the floor extensions 27, 27 and the side sill extensions 28, 28 and the substantially triangle-shaped body with high rigidity is formed, the load can be transmitted to the rear side of the vehicle body without deforming the front floor panel 45 and the feet of the occupant can be protected when the load is applied.

In the vehicle body structure, the footrest sections 43, 44 include reinforcing sections 43a, 44a substantially triangle-shaped and further bulging in the lower direction of the vehicle body 11 between the floor extensions 27, 27 and the side sill extensions 28, 28 as illustrated in FIGS. 1 to 3 (also see FIG. 5).

In other words, since the reinforcing sections 43a, 44a are provided at the footrest sections 43, 44 (front floor panel 45) between the floor extensions 27, 27 and the side sill extensions 28, 28, the load transmitted to the front floor panel 45 having the reduced burden by being connected to the left and right side sills 23, 23 is transmitted to the left and right side sills 23, 23 via the center tunnel cross member 34. As a result, the floor frames 31, 32 may have the thickness to cope with the load having the reduced burden, thereby contributing to lowering the floor of the vehicle body 11.

Also, since the reinforcing sections 43a, 44a are provided at the footrest sections 43, 44 (front floor panel 45) between the floor extensions 27, 27 and the side sill extensions 28, 28, the substantially triangle-shaped body with high rigidity is further formed, thereby achieving to transmit the load to the rear side of the vehicle body without deforming the front floor panel 45 and protect the feet of the occupant when the load is applied.

The vehicle body structure according to the present invention is described for the vehicle 10 which is the passenger car as illustrated in FIG. 1, but the vehicle type is not limited thereto and it is not to preclude adoption of other types of vehicles such as a mini-van or a freight vehicle.

INDUSTRIAL APPLICABILITY

The vehicle body structure according to the present invention is suitable to be adopted for a passenger car such as a sedan and van.

REFERENCE SIGNS LIST

11 Vehicle body
18 Energy container (fuel tank)
21 Dashboard lower
21a Lower surface of dashboard lower
22 Left and right: front side frames
22a Rear end of left and right front side frames
12 Left and right side sills
24 Floor panel
25 Tunnel section
27 Left and right floor extensions
28 Side sill extension
31,32 Floor frame
34 Center tunnel cross member
43,44 Footrest section
43a,44a Substantially triangular-shaped reinforcing section
45 Front floor panel
45a Lower surface of front floor panel
46 Rear floor panel
47,48 Seat of vehicle body
51,52 Bulging section
51a,52a Rear end of bulging section
57 Front tunnel cross member
58 Rear tunnel cross member
81 Main body section of floor frame
81a Front end of main body section
82 Lid section of floor frame
83 Load transmitting section
84 Load receiving section
86 Left and right vertical wall section of floor extension
86b,86b Rear ends of vertical wall section
88a Flange (vertical flange)
101 Joint of front floor panel and rear floor panel
102 Joint of dashboard lower and floor panel

The invention claimed is:
1. A vehicle body structure, comprising:
left and right front side frames positioned at a front portion of a vehicle body and extending in a front-rear direction of the vehicle body;
a dashboard lower positioned at a rear side of the left and right front side frames and dividing the vehicle body into front and rear portions;
a floor panel extending in a vehicle width direction of the vehicle body and also extending rearward from a lower portion of the dashboard lower; and
a tunnel section extending from a center of the vehicle width and a lower end of the dashboard lower to a rear portion of the floor panel, and bulging upward from the floor panel,
wherein the floor panel includes:
left and right bulging sections disposed on left and right sides of the tunnel section for installation of seats of the vehicle body; and
a rear tunnel cross member disposed on rear ends of the left and right bulging sections and extending in the vehicle width direction, the vehicle body includes:

left and right floor extensions deflected toward the tunnel section along a lower surface of the dashboard lower from rear ends of the left and right front side frames;

left and right floor frames extending so as to span between the left and right floor extensions and the rear tunnel cross member, and having a predetermined distance in a vehicle body vertical direction from a rear floor panel; and an energy container disposed below the bulging sections and supported by the floor frames, and the floor frames are detachably fixed to the vehicle body from the lower side of the vehicle body.

2. The vehicle body structure according to claim 1, wherein the vehicle body includes a front tunnel cross member spanning between the left and right floor extensions and extending in the vehicle width direction along a lower surface of the tunnel section near a joint of the dashboard lower and the floor panel, the floor panel includes a front floor panel and a rear floor panel on front and rear sides of the vehicle body in a dividing manner, the front, floor panel includes footrest sections bulging in a lower direction of the vehicle body and disposed on left and right sides of the tunnel section at positions corresponding to feet of occupants riding on the vehicle body, and the rear floor panel includes the bulging sections, and the front floor panel has a strength higher than a strength of the rear floor panel.

3. The vehicle body structure according to claim 1, wherein each of the left and right floor extensions includes a load transmitting section formed with a recessed cross-section by closing rear ends of left and right vertical wall sections inward, and each of the floor frames includes a main body section having a hat-like cross-section and a lid section closing the main body section, the floor frames having a load receiving section formed by bending a flange downward from a front end of the main body section, and the load transmitting section and the load receiving section are positioned so as to face each other when the floor frames are mounted on the vehicle body.

4. The vehicle body structure according to claim 2, the vehicle body comprising:

left and right side sills positioned on the rear side of the dashboard lower and further positioned on a more outer side of the vehicle width than the left and right front side frames, extending in a front-rear direction of the vehicle body;

left and right side sill extensions deflected toward the side sills along a lower surface of the front floor panel from rear ends of the left and right front side frames; and a center tunnel cross member spanning between the left and right side sills above a joint of the front floor panel and the rear floor panel, wherein the front floor panel includes the footrest sections each disposed between one of the floor extensions and an adjacent one of the side sill extensions.

5. The vehicle body structure according to claim 4, wherein each of the footrest sections includes a reinforcing section further bulging in a lower direction of the vehicle body and substantially triangle-shaped between one of the floor extensions and an adjacent one of the side sill extensions.

* * * * *